United States Patent
Koorapaty et al.

(10) Patent No.: US 9,801,119 B2
(45) Date of Patent: Oct. 24, 2017

(54) DISCOVERY SIGNAL DESIGN IN A RADIO COMMUNICATIONS NETWORK

(71) Applicant: Telefonaktiebolaget L M Ericsson (publ), Stockholm (SE)

(72) Inventors: Havish Koorapaty, Saratoga, CA (US); Ali Behravan, Stockholm (SE); Mattias Frenne, Uppsala (SE); George Jöngren, Sundbyberg (SE); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 14/438,712

(22) PCT Filed: Feb. 4, 2015

(86) PCT No.: PCT/SE2015/050123
§ 371 (c)(1),
(2) Date: Apr. 27, 2015

(87) PCT Pub. No.: WO2015/171039
PCT Pub. Date: Nov. 12, 2015

(65) Prior Publication Data
US 2016/0249279 A1 Aug. 25, 2016

Related U.S. Application Data

(60) Provisional application No. 61/990,753, filed on May 9, 2014.

(51) Int. Cl.
*H04W 4/00* (2009.01)
*H04W 48/16* (2009.01)
(Continued)

(52) U.S. Cl.
CPC ............... *H04W 48/16* (2013.01); *H04L 5/00* (2013.01); *H04W 8/005* (2013.01);
(Continued)

(58) Field of Classification Search
CPC ... H04W 48/16; H04W 72/042; H04W 8/005; H04W 72/0446; H04W 84/045; H04L 5/00
See application file for complete search history.

(56) References Cited

U.S. PATENT DOCUMENTS

| 2013/0182799 | A1* | 7/2013 | Geirhofer | H04W 56/00 375/340 |
| 2014/0112184 | A1* | 4/2014 | Chai | H04L 5/0091 370/252 |
| 2015/0304081 | A1* | 10/2015 | Park | H04L 5/0048 370/329 |

OTHER PUBLICATIONS

Intel Corporation, "Downlink control signaling for DL CoMP", 3GPP TSG.RAN WG1 #68bis, Jeju, Korea, Mar. 26, 2012, pp. 1-4, R1-121517, 3GPP.

(Continued)

*Primary Examiner* — Afshawn Towfighi
(74) *Attorney, Agent, or Firm* — Coats & Bennett, PLLC

(57) ABSTRACT

Embodiments herein relate to a methods performed by a wireless device (121) for handling discovery signals from one or more transmission points (111, 112) or cells (115, 116) in a radio communications network (100). Embodiments herein further relates to methods performed by a network node (110) for handling discovery signals from one or more transmission points (111, 112) or cells (115, 116) in a radio communications network (100). The method performed by the UE (121) comprises: determining (1101) an identity of a cell associated with received synchronization signals and/or Channel State Information Reference Symbol, CSI-RS, configuration information; and applying (1102) CSI-RS configurations when receiving discovery signals on radio resources associated with CSI-RS based on the deter- (Continued)

One OFDM symbol including cp mined identity of the cell and/or CSI-RS configuration information. Embodiments of the wireless device (121) and the network node (110) are also described.

20 Claims, 10 Drawing Sheets

(51) Int. Cl.
*H04L 5/00* (2006.01)
*H04W 8/00* (2009.01)
*H04W 72/04* (2009.01)
*H04W 84/04* (2009.01)

(52) U.S. Cl.
CPC ..... *H04W 72/042* (2013.01); *H04W 72/0446* (2013.01); *H04W 84/045* (2013.01)

(56) References Cited

OTHER PUBLICATIONS

Huawei, et al., "Discussion on network assistance signaling for small cell discovery", 3GPP' TSG RAN WG I Meeting #78, Dresden, Germany, Aug. 18, 2014, pp. 1-5, R1-142828, 3GPP.

Ericsson, "Design of Discovery Signals and Procedures", 3GPP TSG RAN WG1 Meeting #76bis, Seoul, Korea, May 19, 2014, pp. 1-8, R1-142386, 3GPP.

Intel Corporation, "Discussion on cell-specific parameters configuration for CSI-RS", 3GPP TSG-RAN WG1 #69, Prague, Czech, May 21, 2012, pp. 1-2, R1-122633, 3GPP.

3rd Generation Parnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.1.0, Dec. 1, 2012, pp. 1-160, 3GPP, France.

Ericsson, "DRS-based TP identification", 3GPP TSG-RAN WG4 Meeting #72bis, Singapore, Oct. 6, 2014, pp. 1-2, R4-146341, 3GPP.

Huawei, et al., "RRC details to support DRS measurement", 3GPP TSG-RAN WG2 #87bis, Shanghai, China, Oct. 6, 2014, pp. 1-4, R2-144137, 3GPP.

Panasonic, "Flexible CoMP Operation based on Dedicated CSI-RS Configuration", 3GPP TSG RAN WG1 Meeting #66b, Zhuhai, China, Oct. 10, 2011, pp. 1-5, R1-113124, 3GPP.

* cited by examiner

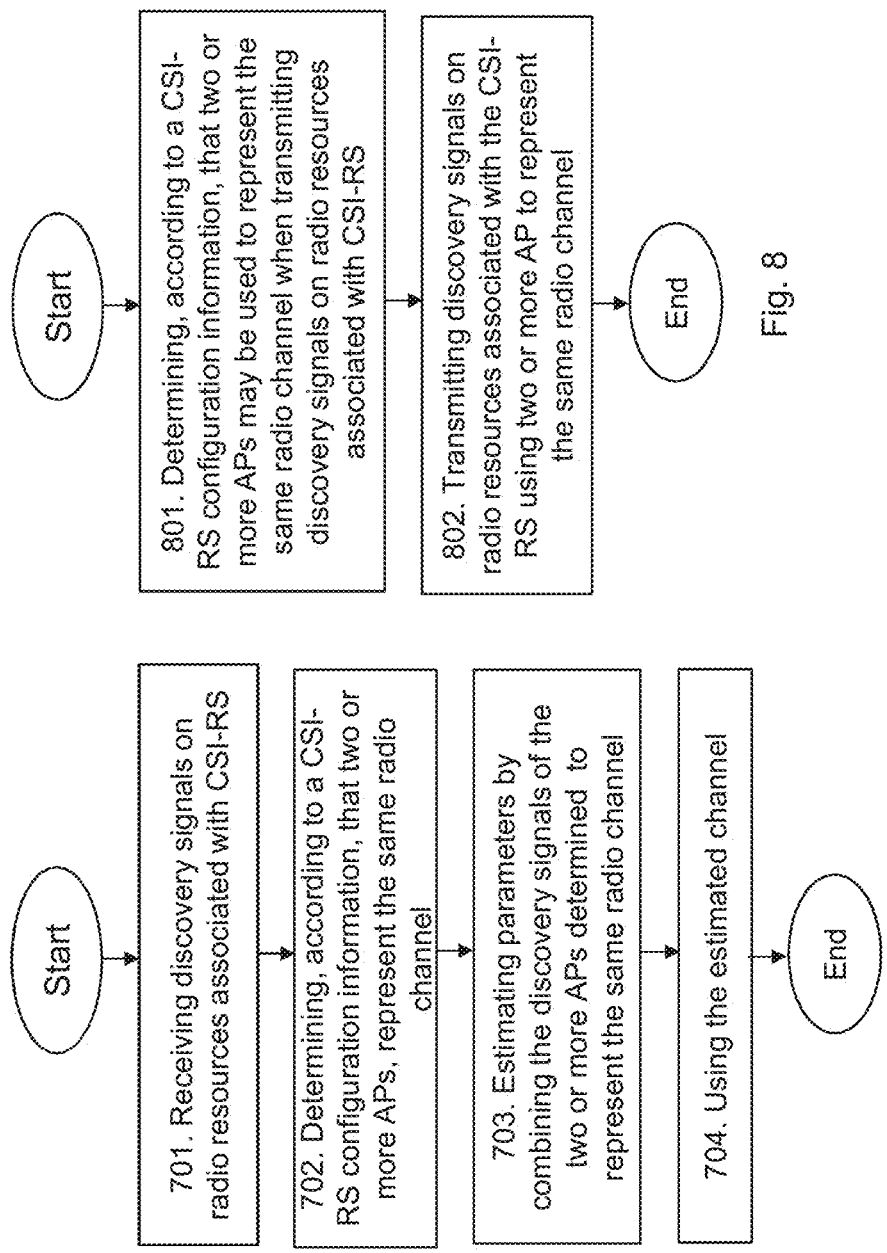

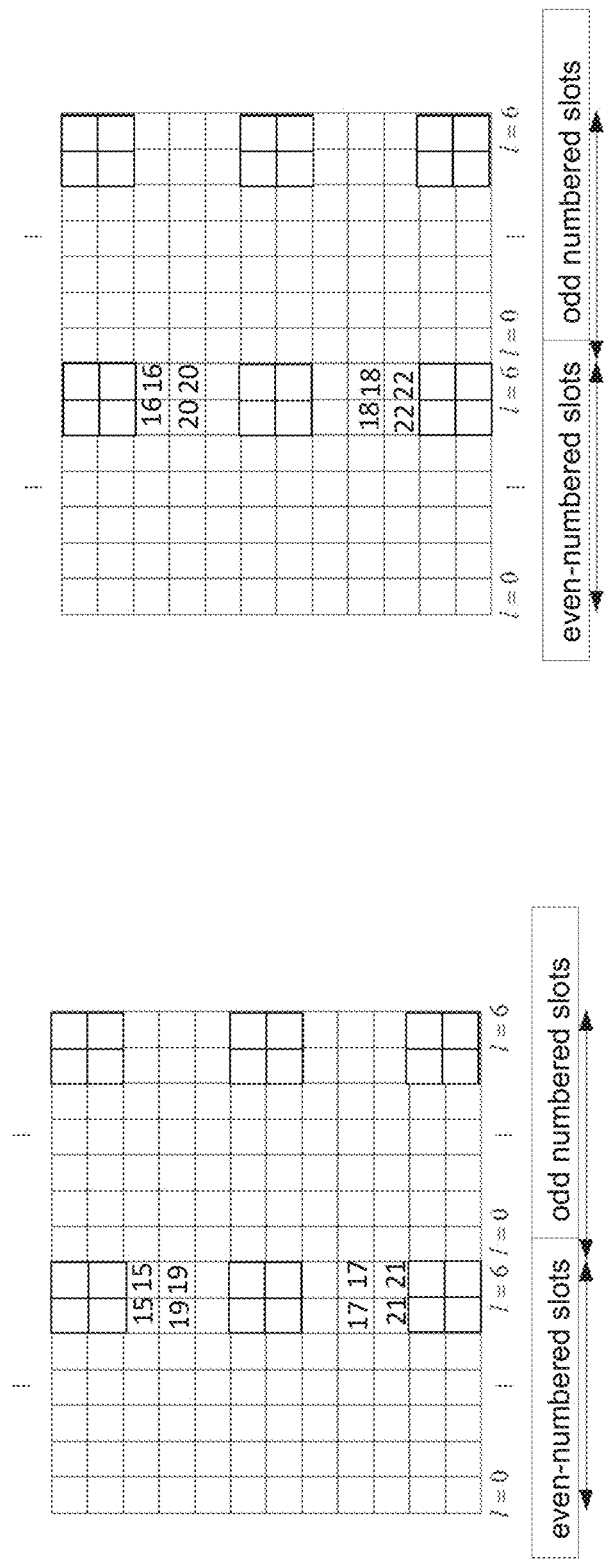
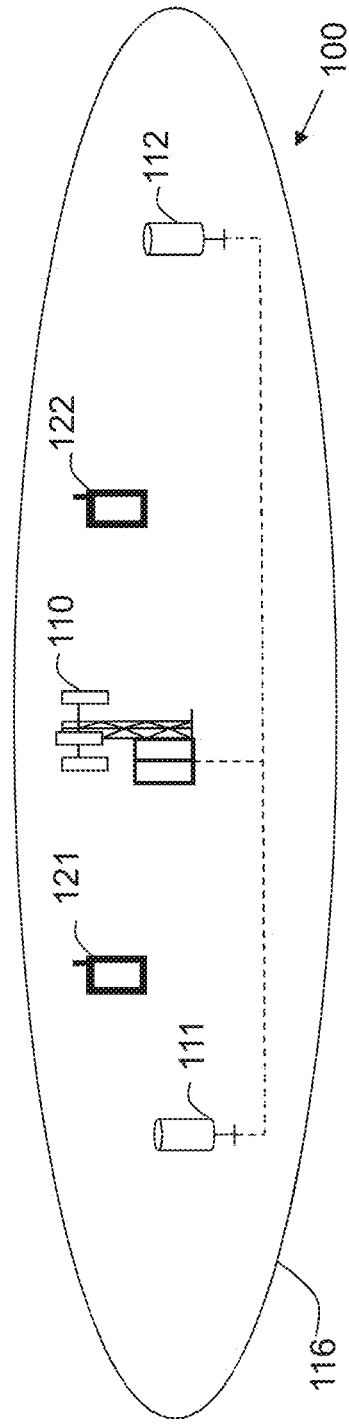
Fig. 9

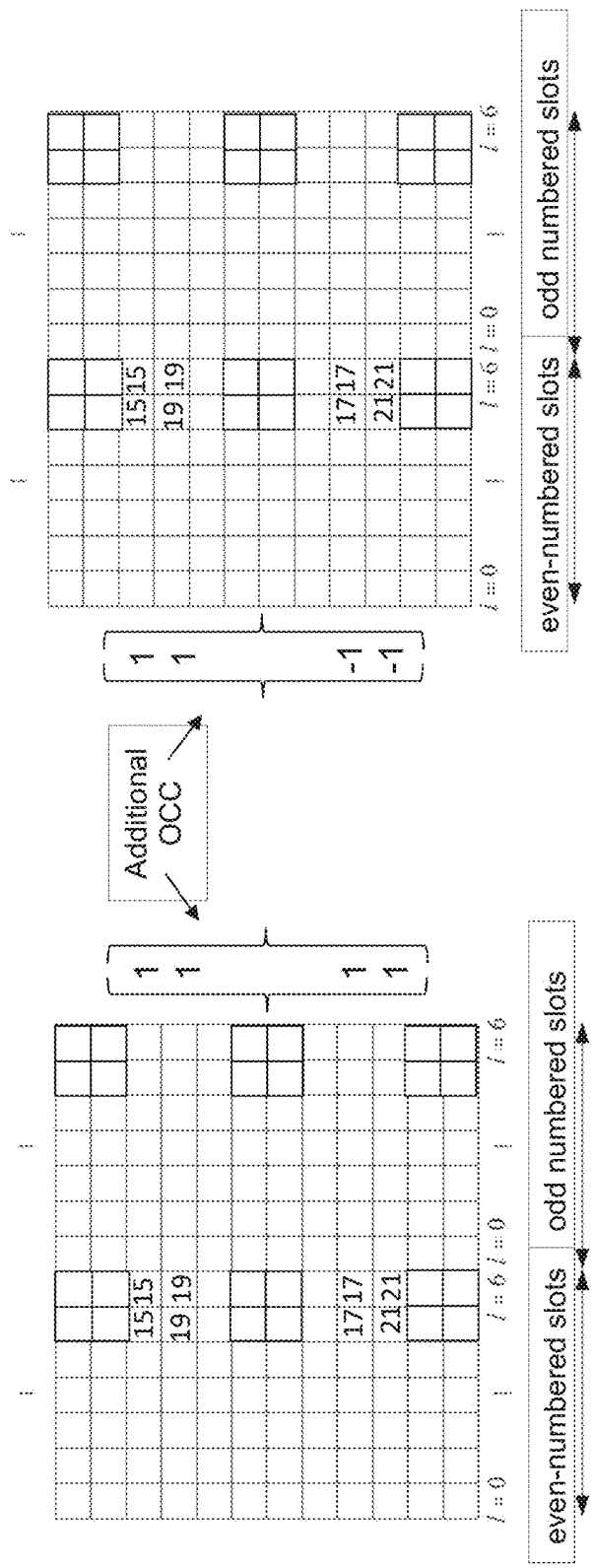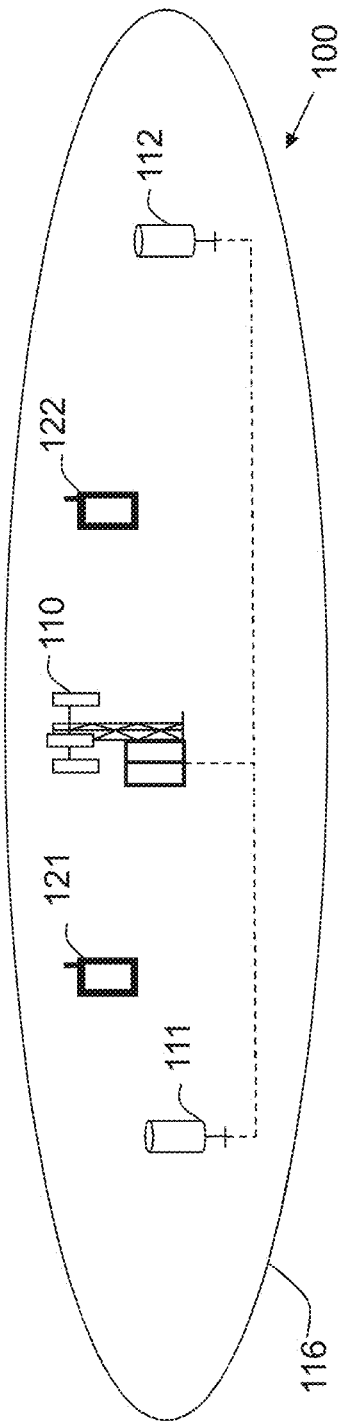
Fig. 10

DISCOVERY SIGNAL DESIGN IN A RADIO COMMUNICATIONS NETWORK

TECHNICAL FIELD

Embodiments herein relate to designing discovery signalling in a radio communications network. In particular, embodiments herein relate to a wireless device e.g. a user equipment, a network node and methods therein for handling discovery signals in a radio communications network.

BACKGROUND

In a typical radio communications network, wireless terminals, also known as mobile stations, wireless devices and/or user equipments, UEs, communicate via a Radio Access Network, RAN, to one or more core networks. The RAN covers a geographical area which is divided into cell areas, with each cell is served by a base station, e.g. a radio base station, RBS, or network node, which in some networks may also be called, for example, "NodeB", "eNodeB" or "eNB".

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE, the functions of a RNC are distributed between the radio base stations nodes, e.g. eNBs in LTE, and the core network. As such, the Radio Access Network, RAN, of an EPS has an essentially flat rather than hierarchical architecture comprising radio base station nodes without reporting to RNCs.

Regardless of the wireless communications technology used in the radio communications network, a cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. The base stations communicate over the air interface operating on radio frequencies with the user equipments within range of the base stations.

Frame Structure and Reference Symbols, RS, in LTE

Even though not limited to any wireless communications technology, reference and explanations may be provided herein with respect a LTE network. Thus, a brief overview of the LTE frame structure and Reference Symbols, RS, is provided below.

LTE is a Frequency Division Multiplexing, FDM, technology, wherein Orthogonal Frequency Division Multiplexing, OFDM, is used in e.g. a downlink, DL, transmission from a eNB to a UE. The basic LTE downlink physical resource may thus be seen as a time-frequency grid as illustrated in FIG. 1, where each Resource Element, RE, corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE DL transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of Resource Blocks, where a RB corresponds to one slot of 0.5 ms in the time domain (7 OFDM symbols) and 12 subcarriers in the frequency domain. RBs are numbered in the frequency domain, starting with resource block 0 from one end of the system bandwidth. Thus, an RB consists of 84 REs.

DL and UL transmissions are dynamically scheduled, i.e. in each subframe the eNB transmits control information about to or from which UEs data is transmitted and upon which RBs the data is transmitted. The control information for a given UE is transmitted using one or multiple Physical Downlink Control Channels (PDCCH). Control information of a PDCCH is transmitted in the control region comprising the first n=1, 2, 3 or 4 OFDM symbols in each subframe where n is the Control Format Indicator (CFI). Typically the control region may comprise many PDCCH carrying control information to multiple UEs simultaneously. A downlink system with 3 OFDM symbols allocated for control signaling, for example the PDCCH, is illustrated in FIG. 3 and denoted as control region. The REs used for control signaling are indicated with wave-formed lines and REs used for reference symbols are indicated with diagonal lines. Frequencies f or subcarriers are defined along an z-axis and symbols are defined along an x-axis.

The signal transmitted by the eNB in a DL subframe may be transmitted from multiple antennas, and the signal may be received at a UE that has multiple antennas. The radio channel distorts the transmitted signals from the multiple antenna ports. In order to demodulate any transmissions on the DL, a UE relies on the RS that are transmitted on the DL. In addition, RS may be used to measure the channel between the transmitter and the receiver antenna. Therefore, Antenna Ports, AP, is introduced in the LTE specifications. Each RS is associated with an AP. When the UE is measuring the channel using the RS, it may be referred to as the UE is measuring the channel from the stated AP to its receiver antenna. It shall be noted that it is up to transmitter implementation how to transmit the RS in case there are multiple physical antennas at the transmitter side used to transmit the RS for a single AP. The mapping of a RS to multiple physical antennas is called antenna virtualization and this operation is transparent to the UE, since the UE may only measure the channel on the given RS, i.e. the AP.

The RS and their position in the OFDM time-frequency grid are known to the UE. Hence, this may be used to synchronize to the DL signal and determine channel estimates by measuring the effect of the radio channel on these RS. In Release 11 LTE network, and in prior releases, there are multiple types of RS. The Common Reference Symbols, CRS, which corresponds to AP 0-3, are used for channel estimation during demodulation of control and data messages in addition to synchronization. The CRS are present in every subframe. The Channel State Information Reference Symbols, CSI-RS, which correspond to AP 15-22, are also used for channel state feedback related to the use of transmission modes that enable UE-specific antenna precoding. These transmission modes use the UE-specific Demodulation Reference Symbols, DM-RS, which correspond to AP 7-14, at the time of transmission with the precoding at the eNB performed based on the feedback received from and measured by the UE on the CSI-RS.

Furthermore, a primary synchronization signal, PSS, and a secondary synchronization signal, SSS, are used for cell search and coarse time and frequency synchronization. These signals are strictly not reference signals but synchronization signals and hence do not correspond to any numbered antenna port in the LTE specifications. FIG. 4 shows all of the above reference signals, i.e. CRS, CSI-RS, DM-RS, PSS, SSS, over two subframes of duration 1 ms each.

FIG. 5 shows a RE grid over an RB pair depicting the potential positions for CRS, CSI-RS, DM-RS. Here, the potential positions for CSI-RS are marked with a number corresponding to the CSI-RS AP.

The CSI-RS are modulated using a sequence that depends on a configurable, or virtual, cell ID that can be different from the cell ID being used in the cell. The CSI-RS also utilizes an orthogonal cover code of length two to overlay two APs on two consecutive REs. Many different CSI-RS patterns are available. For example, in case of 2 CSI-RS APs, there are 20 different patterns within a subframe. The corresponding number of patterns is 10 and 5 for 4 and 8 CSI-RS APs, respectively. For TDD, some additional CSI-RS patterns are available.

The PSS and SSS define the cell ID of the cell. The SSS may take 168 different values representing different cell ID groups. The PSS may take three different values that determine the cell ID within a group. Thus, there are a total of 504 cell IDs. The PSS are Zadoff-Chu sequences of length 63 which along with 5 zeros appended on each edge occupy the 73 subcarriers in the central 6 RBs. The SSS are two m-sequences of length 31 that occupy alternate REs and are appended with 5 zeros on each edge and located in the central 6 RBs as is the case for the PSS. The PSS and SSS sequences occur in subframes #0 and #5. The PSS is the same in both subframe #0 and #5 while the SSS sequences differs between the subframes. The sequence transmitted in subframe #0 is referred to as $SSS_1$ while the sequence transmitted in subframe #5 is referred to as $SSS_2$. The sequence, $SSS_2$ swaps the two length-31 m-sequences transmitted as part of the sequence $SSS_1$ in subframe #0.

Two APs, even belonging to different RS types, such as, e.g. CSI-RS and DMRS, may be identified as quasi-colocated, QCL, if some of the large scale channel properties, such as, delay spread, Doppler spread, Doppler shift, average gain and average delay corresponding to one AP may be inferred from the other AP. Which AP that are QCL and under what circumstances are given in 3GPP TS 36.213.

Discovery Signals

Dense deployments of small cells are attractive to increase system capacity in the radio communications. However, dense deployments typically have fewer UEs connected to each cell and lower resource utilization, with higher rates provided when the cells are used. RS structures that are developed for regular deployments with existing systems, such as, e.g. a 3GPP LTE network, may have too high a density so that there is a lot of unnecessary interference created, within or between cells, when deployments become dense. For example, RS may be transmitted even when there is no data being sent to UEs.

In order to tackle this problem of unnecessary interference, solutions to turn small cells off when they are not being used are being considered. However, to ensure that cells can be ready to deliver data to and receive data from UEs with minimal delay, it is necessary for UEs to make some essential measurements on cells even when they are off. In order to facilitate this, a set of RS that are sent with much lower density in time have been discussed. Such RS signals are commonly referred to as discovery signals and procedures associated with them as discovery procedures.

In a Release 12 LTE network, for a small cell on/off where the eNB can be off for long periods of time in order to assist the UE with the measurements, a discovery signal might be needed. The discovery signal needs to support the properties required for enabling RRM measurements, RLM related procedures and coarse time/frequency synchronization. In order to make the UE measurements possible, the eNB has to wake up periodically, e.g. once every 80 ms, or 160 ms, etc., and send the discovery signal so that it can be used by the UE for mobility related operations, such as, e.g. cell identification, RLM and measurement. Within one cell, there may be multiple TPs from which the DL signal may be transmitted. One example of this, it a Distributed Antenna System, DAS, wherein multiple radio remote heads that are physically dislocated within the cell transmit signals that all belong to the same cell, i.e. same Cell-ID. The term TP may also refer to a sector of a site where the different sectors of the same site then constitute different TPs. The discovery signal should also be capable of identifying individual TPs and enabling RRM measurements for them.

In addition to the ability to turn cells on and off, it is also beneficial for discovery signals to be able to allow UEs to make received power and quality measurements, such as, e.g. Reference Signal Received Power, RSRP, and Reference Signal Received Quality, RSRQ, measurements in an LTE network, for individual Transmission Points, TPs, that may be a part of a cell where the TPs may be geographically separated within the cell. This may facilitate the turning off and on of individual TPs, as well as, allow the cell to determine how to configure measurements of TPs of UEs for the purpose of obtaining more detailed Channel State Information, CSI, estimations.

Signals that may be deployed independently over multiple TPs exist in radio communication networks today. For example, in a LTE network, these are the Channel State Information Reference Signals, CSI-RS, as described above. However, simple RSRP and RSRQ measurements are not currently defined for them.

Definition of such measurements based on the CSI-RS and its use as a discovery signal is currently being discussed. However, as can be seen from the above, the CSI-RS have a high degree of configurability and are designed to be used for CSI measurements by the UE. Thus, due to the high degree of configurability, the UE needs to be provided assistance information by the network about the precise CSI-RS configuration that the UE should use. The provision of such information increases network complexity, since such information is typically not required currently for RSRP and RSRQ measurements. In addition, due to their sparseness, their measurement performance is not as robust as the performance based on the currently used Cell-Specific Reference Signals, CRS.

From the discussion above, it may be concluded that there is a need to provide a discovery signal which do not suffer drawbacks in measurement robustness or in the necessity to provide extensive assistance information from the eNB to the UE.

SUMMARY

It is an object of embodiments herein to provide discovery signals in a radio communications network which overcome at least one of the drawbacks mentioned above.

According to one aspect of embodiments herein, the object is achieved by providing a method performed by a wireless device e.g. a UE for handling discovery signals from one or more transmission points or cells in a radio communications network. The method comprising: determining an identity of a cell, or cell-ID, associated with received synchronization signals, and/or CSI-RS configuration information; and applying CSI-RS configurations on radio resources associated with CSI-RS based on the determined cell-ID and/or CSI-RS configuration information. In some embodiments, the determining the CSI-RS configuration information is performed by the UE by receiving the CSI-RS configuration information via RRC signaling from a network node serving the UE in the radio communications network. Alternatively, in some embodiments, this may be performed by obtaining predetermined, or determined or set, CSI-RS configuration information present in the UE. In some embodiments, the CSI-RS configuration information may comprise one or more of: a number of Antenna Ports, APs, to be used when receiving the discovery signals; an indication of the relation between a CSI-RS configuration and the determined identity of a cell, cell-ID, to be used when receiving the discovery signals; a set of configurable, or virtual, cell identities, or cell-IDs, associated with the determined identity of a cell, cell-ID, to be used when receiving the discovery signals; a set of precoding matrices, or discovery signal precoding matrices, associated with the determined identity of a cell, cell-ID, to be used when receiving the discovery signals; and a set of Orthogonal Cover Codes, OCCs, associated with the determined identity of a cell, cell-ID, to be used when receiving the discovery signals.

According to another aspect of embodiments herein, the object is achieved by providing a wireless device (e.g. a UE) for handling discovery signals from one or more transmission points (TPs) or cells in a radio communications network, the wireless device comprise a processor configured to determine an identity of a cell associated with received synchronization signals and/or Channel State Information Reference Symbol, CSI-RS, configuration information, and apply CSI-RS configurations when receiving discovery signals on radio resources associated with CSI-RS based on the determined identity of the cell and/or CSI-RS configuration information.

According to another aspect of embodiments herein, the object is achieved by providing a method by a network node for handling discovery signals from one or more TPs or cells in a radio communications network. The method comprising: transmitting synchronization signals from the one or more TPs or cells. The method further comprising: determining CSI-RS configuration information to be used in a wireless device when receiving discovery signals transmitted on radio resources associated with CSI-RS by the network node. Here, the CSI-RS configuration information may comprise one or more of: a number of Antenna Ports, APs, an indication of the relation between a CSI-RS configuration and the determined identity of a cell, cell-ID, a set of configurable, or virtual, cell-IDs associated with the determined identity of a cell, cell-ID, a set of precoding matrices, or discovery signal precoding matrices, associated with the determined identity of a cell, cell-ID, to be used when receiving the discovery signals, and a set of Orthogonal Cover Codes, OCCs, associated with the determined identity of a cell, cell-ID, to be used when receiving the discovery signals. The method further comprising: transmitting the determined CSI-RS configuration information from the one or more TPs or cells.

According to another aspect of embodiments herein, the object is achieved by providing a network node for handling discovery signals from one or more transmission points or cells in a radio communications network, the network node comprising a transceiver configured to transmit synchronization signals from the one or more transmission points or cells, and a processor configured to determine Channel State Information Reference Symbol, CSI-RS, configuration information to be used in a wireless device when receiving discovery signals transmitted on radio resources associated with CSI-RS by the network node, wherein the CSI-RS configuration information comprises an indication of the relation between a CSI-RS configuration and the determined identity of a cell, wherein the transceiver is further configured to transmit the determined CSI-RS configuration information from the one or more transmission points or cells.

According to another aspect of embodiments herein, the object is achieved by providing a method performed by a network node for handling discovery signals from one or more transmission points in a radio communications network, the method comprising: determining that two or more transmission points are sharing a cell; and transmitting discovery signals, from the two or more transmission points quasi-co-located with Demodulation Reference Symbols, DM-RS, specific for a wireless device when the two or more transmission points are sharing a cell.

According to another aspect of embodiments herein, the object is achieved by providing a network node for handling discovery signals from one or more transmission points in a radio communications network, the network node comprising a processor configured to determine that two or more transmission points are sharing a cell; and a transceiver configured to transmit discovery signals, from the two or more transmission points quasi-co-located with Demodulation Reference Symbols, DM-RS, specific for a wireless device when the two or more transmission points are sharing a cell.

Accordingly, the embodiments herein use UEs, network nodes and methods therein which enable the CSI signals, such as, e.g. the CSI-RS, to be used for cell discovery without suffering drawbacks in measurement robustness and/or in the necessity to provide extensive assistance information from the network node to the UE; that is, the embodiments described herein uses the existing RS, e.g. the CSI-RS, to define discovery signals, e.g. in a LTE network, that provide the ability to perform cell and transmission point discovery with minimal additional network complexity and minimal signalling overhead.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 7 is a flowchart depicting an exemplary embodiment of a method for a user equipment, FIG. 8 is a flowchart depicting an exemplary embodiment of a method for a network node.

FIG. 9 is a schematic overview illustrating a network comprising user equipments and network nodes.

FIG. 10 is a schematic overview illustrating a network comprising user equipments and network nodes.

DETAILED DESCRIPTION

Figure 1:
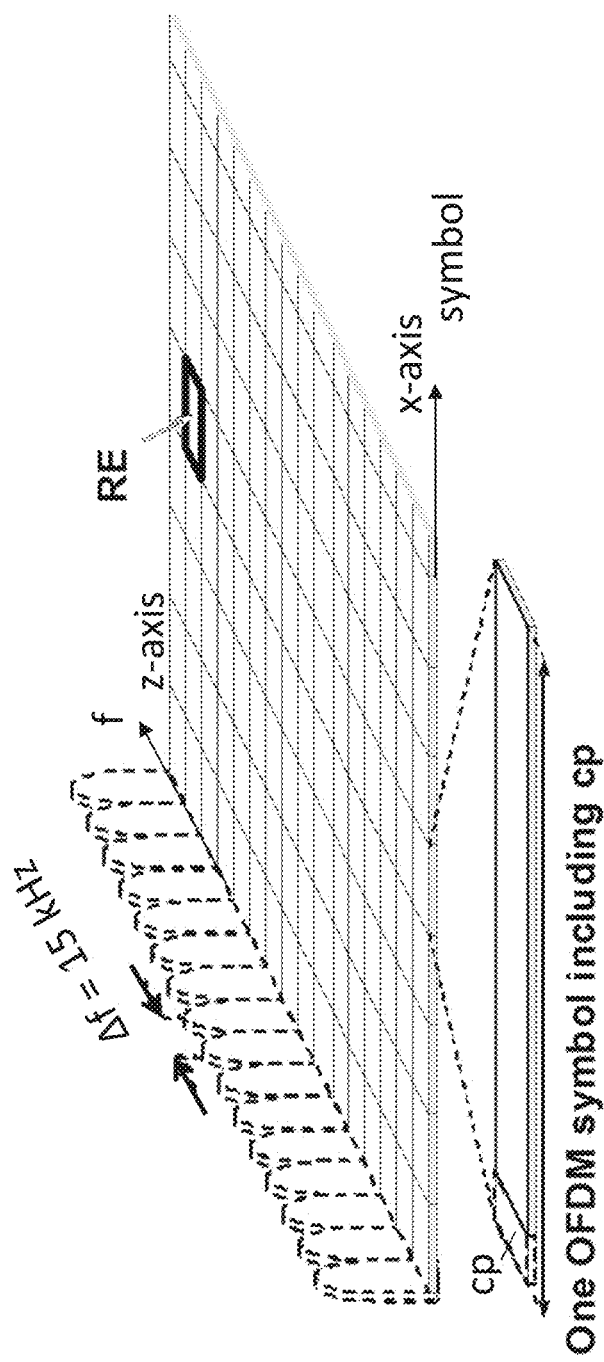
FIG. 1 is a schematic block diagram of a LTE downlink physical resource.
Figure 2:
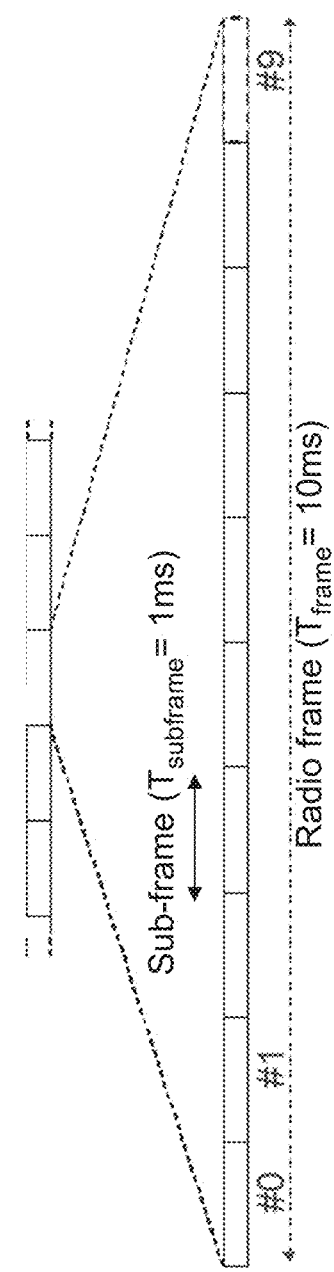
FIG. 2 is a schematic overview depicting radio frames.
Figure 3:
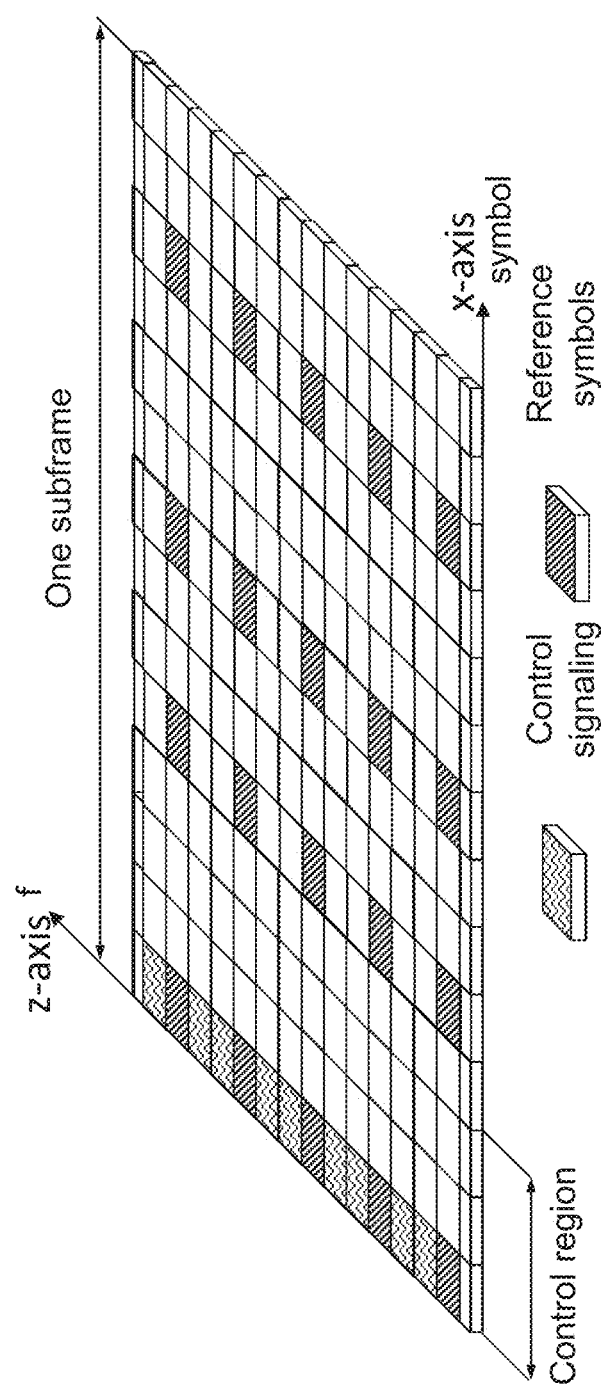
FIG. 3 is a schematic overview depicting a DL subframe.
Figure 4:
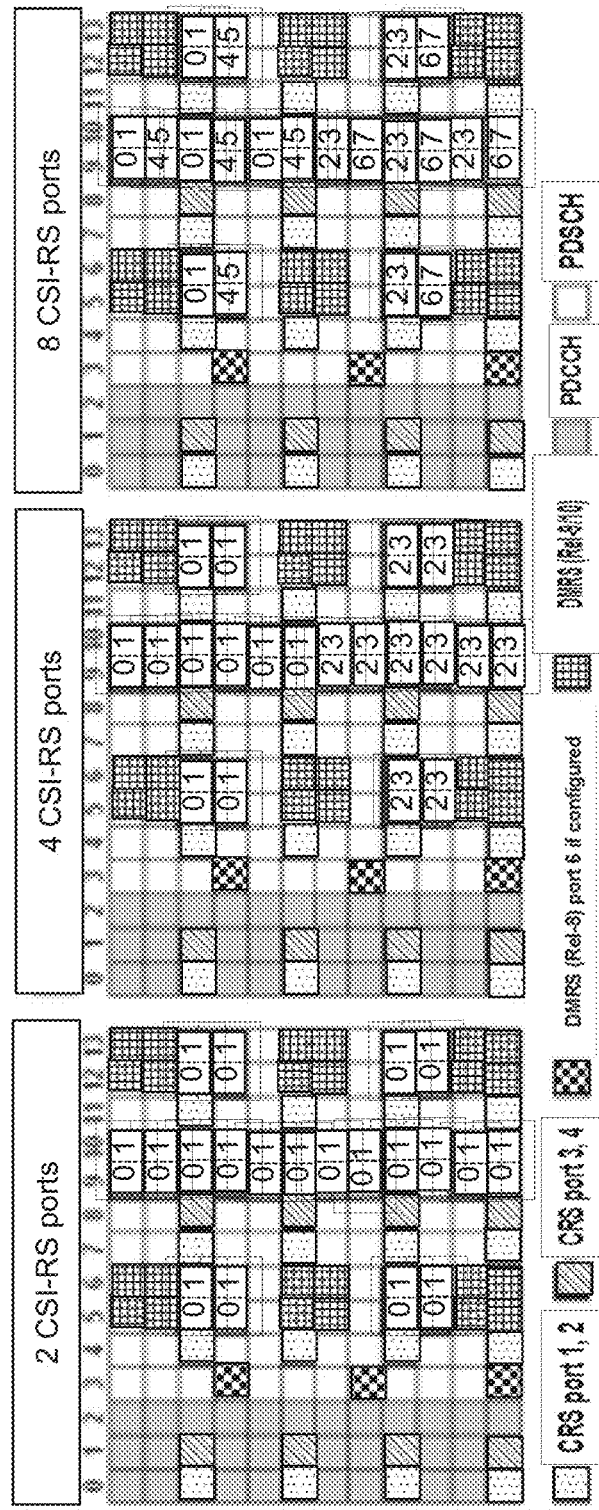
FIG. 4 is a schematic illustration depicting examples of radio resource positions of reference signals in the OFDM grid.

The figures are schematic and simplified for clarity, and they merely show details which are essential to the understanding of the embodiments presented herein, while other details have been left out. Throughout, the same reference numerals are used for identical or corresponding parts or steps.

Figure 6:
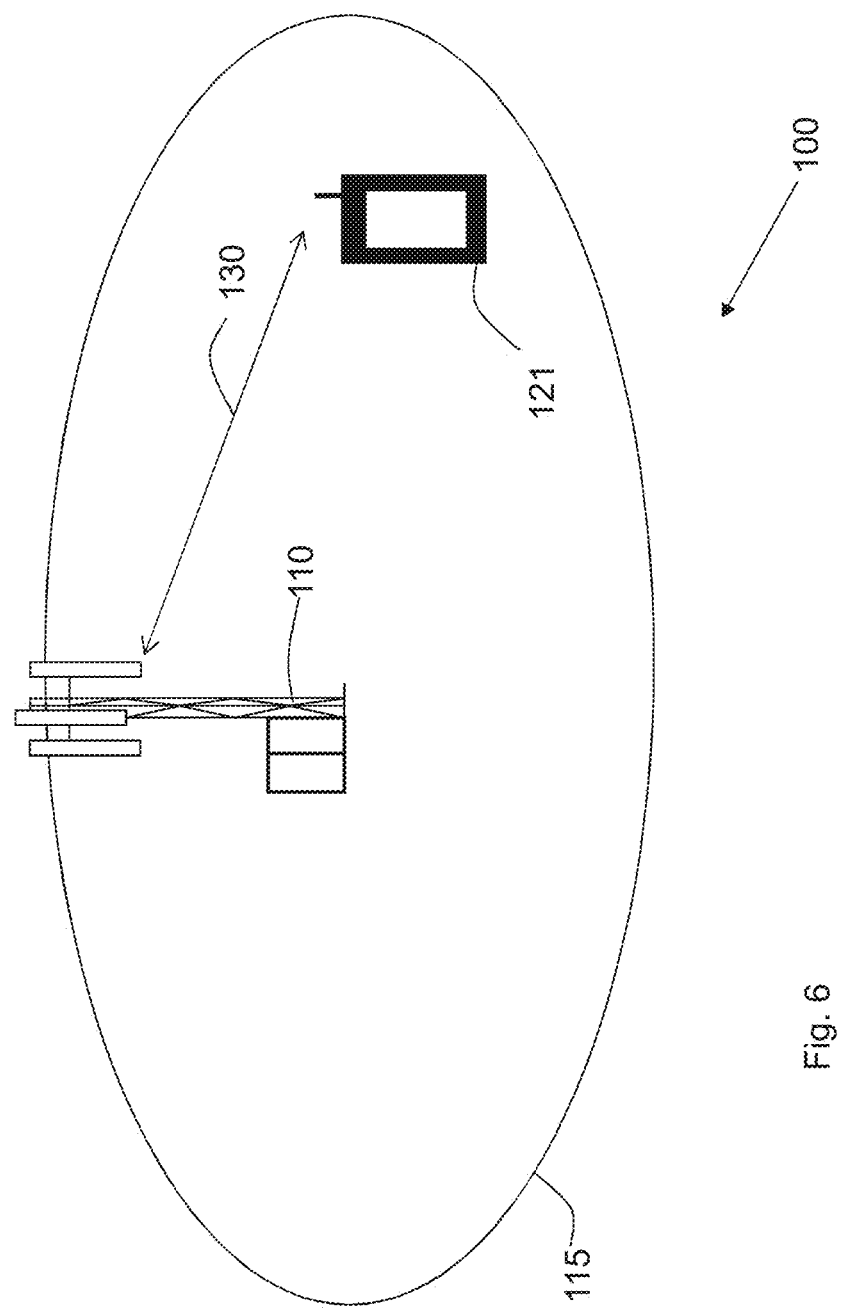
FIG. 6 is a schematic block diagram illustrating a network comprising a user equipment and a network node.

FIG. 6 shows an example of a radio communication network 100 in which embodiments herein may be implemented. Although illustrated in FIG. 6 as an LTE network, the radio communications network 100 may be any wireless communication system, such as, LTE, LTE-Advanced, Wideband Code Division Multiple Access (WCDMA), High-Speed Packet Access (HSPA), Global System for Mobile communications/Enhanced Data rate for GSM Evolution (GSM/EDGE), GSM/GERAN, Worldwide Interoperability for Microwave Access (WiMax), Ultra Mobile Broadband (UMB) or WiFi or WLAN network, or other 3GPP cellular network or system. The radio communications network 100 comprises a network node 110.

The network node 110 may e.g. be an eNodeB (eNB), or a Home Node B, a Home eNode B, multi-standard radio (MSR) radio node, such as, e.g. MSR BS, a Base Station (BS), femto BS, pico BS or any other network unit capable to serve a user equipment, UE 121, in the radio communications system 100. The network node 110 may also be e.g. a base station controller, a network controller, radio network controller (RNC), base station controller (BSC), a relay node, a donor node controlling relay, a base transceiver station (BTS), a transmission point, a transmission node, a repeater, an access point, a radio access point, a Remote Radio Unit (RRU), a Remote Radio Head (RRH), a node in distributed antenna system (DAS), a core network node (e.g. MSC, MME, etc.), O&M, OSS, SON, positioning node (e.g. E-SMLC), MDT, etc. It should also be noted that the non-limiting term network node is used herein to refer to any type of radio network node or any network node, which communicates with a UE and/or with another network node.

Figure 5:
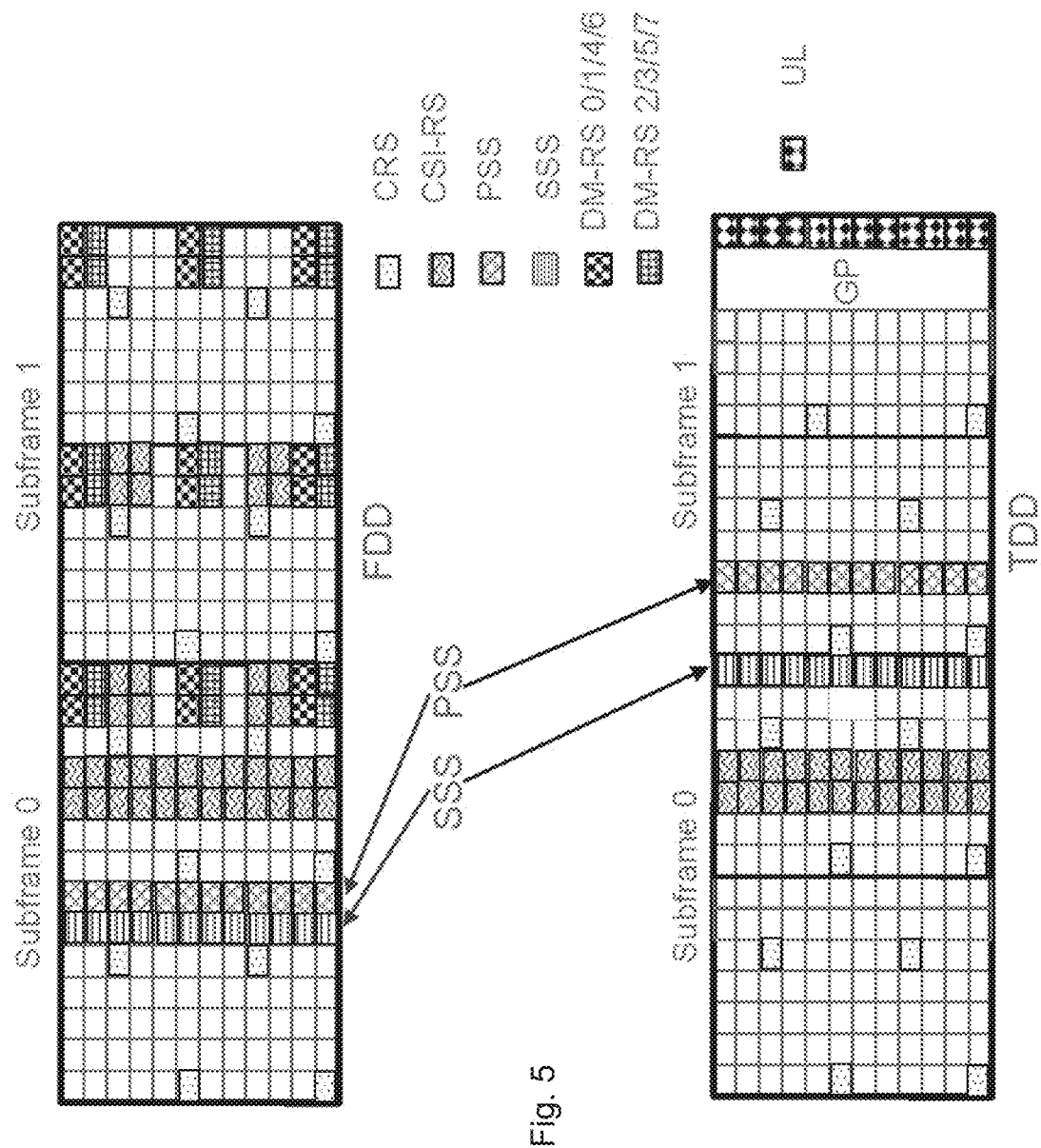
FIG. 5 is a schematic illustration depicting examples of radio resource positions of reference signals of both FDD and TDD carriers in the OFDM grid.

Furthermore, the network node 110 comprise one or more antennas for wireless radio communication with UEs, located within their coverage range; that is, the network node 110 may use one or more of its antennas to provide radio coverage within its cells. In the example shown in FIG. 5, the network node 110 is configured to provide wireless radio coverage to UEs in its cell 115.

A cell may be seen as a geographical area where radio coverage is provided by radio base station equipment at a base station site or at remote locations in RRUs. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole radio communication network 100 may also be broadcasted in the cell. The network node 110 communicates over the air or radio interface operating on radio frequencies with the UEs within range of the network node 110.

A UE 121, is located within the cell 115. The UE 121 is configured to communicate within the radio communications network 100 via the network node 110 over a radio link 130 when present in the cell 115 served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), etc. The UE 121 may also refer to a Machine-to-Machine, M2M, communication device that serves as a data communication modem or is built into equipment communicating data with a server without human interaction. It should also be noted that the non-limiting term UE is used herein to refer to any type of wireless device communicating with a network node and/or with another UE in a cellular or mobile communication system. Furthermore, the embodiments herein may be described with main emphasis on single carrier operation of the UE 121. However, the embodiments herein are applicable for multi-carrier or carrier aggregation operation of the UE 121. Therefore, the embodiments herein may be carried out independently for each cell on each carrier frequency supported by the network node 110.

As part of developing the embodiments herein, it has been noticed that the use of the CRS radio resources for transmitting discovery signals does not allow for Transmission Point, TP, identification since the CRS sequence is common for all TPs within a cell, i.e. given by the Cell-ID configuration parameter. Also, the use of multiple PSS and/or SSS radio resources for transmitting discovery signals precludes the transmission of PDSCH, i.e. data, in a subframe that comprises discovery signals without a loss in performance. Furthermore, the use of CSI-RS radio resources, according to the current CSI-RS configurations, for transmitting discovery signals requires the provision of detailed network assistance, such as, for example, a configuration of a UE by a network node of which CSI-RS radio resource that the UE is to measure on. This will increase complexity of the network node and add additional signalling load in the network.

It is thus a problem how to define the discovery signals that provide no or limited network complexity, the possibility for the UE to identify TPs, and with no or limited PDSCH performance loss.

These issues are addressed by the embodiment herein by having the existing CSI-RS radio resources, e.g. Resource Elements, REs, reused and modified to serve as discovery signals, e.g. the existence of many CSI-RS configurations in the CSI-RS configurations information in the UE 121 supports identification of individual Transmission Points, TPs. In some embodiments, a set of CSI-RS configurations of N={2, 4 or 8} Antenna Ports, APs, are used as the discovery signal. Furthermore, the number of used radio resources (REs) per discovery signal is increased in one or more of the following ways:

The N number of APs in a CSI-RS configuration may be partitioned into G number of groups. Here, a UE 121 may then detect, determine or assume that the AP within the group reflect or represent the same channel, i.e. is a new, single AP.

Discovery signal precoding matrices may be applied by the UE 121 on top of the N number of APs in a CSI-RS configuration. The discovery signal precoding matrices may be obtained or taken from a codebook of diagonal discovery signal precoding matrices of size N×N, i.e. non-zero elements on the diagonal, zeros elsewhere in the matrix. This codebook may be known to both the UE 121 and network node 110.

An additional Orthogonal Cover Code, OCC, who's length spans across radio resources (REs) may be defined. In other words, an OCC length may be redefined to define a new AP using the same REs as used for the original CSI-RS configuration.

Alternatively, in some embodiments, using multiple CSI-RS configurations to define a discovery signal where the radio resources (REs) used for these CSI-RS configurations are adjacent, so as to increase the number of radio resources (REs) available for the discovery signal.

Some embodiments may also comprise using 4 and 8 APss CSI-RS configurations where each AP is transmitted from a different TP or different beam from a TP so that each transmission point uses 4 and 8 REs within a PRB, respectively. Some embodiments may use defined Orthogonal Cover Codes, OCCs, spanning two REs to distinguish between TPs within the same cell that are using the same resource elements, REs. Some embodiments may use different port precoding/precoding operations, or precoding matrices or discovery signal precoding matrices, to provide higher reuse of the radio resources or REs. This may also possibly be combined with the use of different configurable, or virtual, cell IDs. Some embodiments may also use a newly defined OCC of length, e.g. 4 REs, to provide higher reuse of the radio resources or REs. Some embodiments may use two 4 AP CSI-RS configurations that are adjacent to each other in the resource element, RE, grid and signalled as being fully co-located to the UE 121.

According to another aspect address by some embodiments herein, a mechanism is also provided to limit and automatically indicate the CSI-RS configurations to be considered by the UE 121 when making measurements so that the provision of detailed network assistance is not necessary or greatly reduced. In some embodiments, these specific mechanisms may include one or more of the following:

Making the set of considered configurable, or virtual, cell IDs a function of the cell ID for the detected PSS/SSS. In some embodiments, this may further comprise partitioning the cell IDs and configurations so that two TPs belonging to different cells don't use the same configurable, or virtual, cell ID and REs.

Limiting the number of configurations to be used and indexing the configurations to the detected PSS/SSS.

For example, in some embodiments, 4 CSI-RS configurations per detected cell ID may be searched by the UE 121 for up to 8 CSI-RS ports, wherein each port is assigned to a different TP. Also, in some embodiments, a set of CSI-configurations may be dependent, or based on, the cell-ID, for example, the CSI configuration may be configuration {1, 2, 3, 4} if mod(cell ID, 4)=0; or the CSI configuration may be configuration {6, 7, 8, 9} if mod(cell ID, 4)=1; or the CSI configuration may be configuration {12, 13, 14, 15} if mod(cell ID, 4)=2; or the CSI configuration may be configuration {16, 17, 18, 19} if mod (cell ID, 4)=3.

In some embodiments, no configuration of discovery signals needs to be signaled to the UE, since the set of signals to discover are known to the UE. This will reduce network complexity and will not add any load to the existing signaling load.

Example of embodiments of a method performed by a UE 121 for handling discovery signals from one or more TPs or cells in a radio communications network 100, will now be described with reference to the flowchart depicted in FIG. 7. FIG. 7 is an illustrated example of actions or operations which may be taken by the first UE 121. The method may comprise the following actions.

Action 701

In this action, the UE 121 may receive discovery signals on radio resources associated with CSI-RS. This means that the UE 121 may receive, from the one or more TPs and/or cells, discovery signals on radio resources, such as, e.g. REs, associated with CSI-RS.

Action 702

Upon the reception in Action 701, the UE 121 may determine, according to a CSI-RS configuration, that two or more APs represent the same radio channel. This means that the UE 121 may detect, or assume or determine, according to CSI-RS configuration information in the UE 121, that two or more APs transmitting the discovery signals on the radio resources associated with the CSI-RS represent the same radio channel, e.g. is transmitted from the same TP or cell.

Also, in some embodiments, the CSI-RS configuration information in the UE comprises a partition of all APs into two or more groups of APs wherein each group of APs represent the same radio channel. In this case, the UE may detect, or assume or determine, that two or more APs transmitting the discovery signals on the radio resources associated with the CSI-RS represent the same radio channel by detecting, assuming or determining, that the two or more APs are partitioned in the same group of APs according to the CSI-RS configuration information in the UE.

This may also be referred to as distribution of APs across multiple cells or Transmission points, TPs. In some embodiments, the CSI-RS configurations having multiple CSI-RS REs are re-used for discovery signal purposes. In addition, the multiple N APs in a CSI-RS configuration are partitioned into G groups and each group is assigned to a different TP at distinct locations. Hence, each TP uses all of the REs spanned by all the N/G APs in the group. Hence, the UE 121 may detect, or assume or determine, that all the N/G APs belonging to the same partition actually reflect the same channel, i.e. this is in essence then a single, new AP if the AP definition is followed strictly.

This provided the advantage of maximizing, or increasing, the robustness of any measurement performance by providing the largest possible number of REs within a PRB for the chosen CSI-RS configuration that may be coherently combined together for measurements or cell detection in the UE 121. An advantage of using pre-defined CSI-RS configurations is that the amount of signaling used to indicate CSI-RS configurations can be minimized, reduced or eliminated.

In some embodiments, the UE may detect, or assume or determine, that two or more APs transmitting the discovery signals on the radio resources associated with the CSI-RS represent the same radio channel by using a determined Orthogonal Cover Code, OCC, length spanning across the radio resources associated with the CSI-RS on which the two or more APs are transmitting.

This may also be referred to as using Orthogonal Cover Codes, OCCs. This is exemplified and explained more in detail with reference to FIG. 9 below. FIG. 9 shows examples of using 2, 4 and 8 port configurations for the discovery signal and the use of OCCs to distinguish ports transmitted from different TPs.

In FIG. 9, an 8-port CSI configuration for ports, or APs, 15-22 are chosen and partitioned by the network node 110 between two TPs 111,112 connected to the same cell 116. The two TPs 111,112 shown in FIG. 9 may, for example, operate as remote radio heads (RRH) if they are connected to the main cell via a good backhaul connection, e.g. fiber. In FIG. 9, antenna ports 15, 17, 19 and 21 are assigned to one TP 111 and ports 16, 18, 20 and 22 are assigned to another TP 112. This partitioning uses 8 REs to transmit 4 ports from each TP 111, 112, thus maximizing the number of REs used within an RB from a single TP while allowing the use of the same REs on two different TPs due to the orthogonal separation facilitated by the OCCs on each port.

Currently, when an 8-port configuration is signalled, all the ports, or APs, are assumed, or detected or determined, to have potentially independent channels. In such embodiments, the ports that are used in the same TP may all be treated as though they are being sent from the same port or AP.

In some embodiments, this may be signalled to the UE 121 in one of the following ways.
  be defined in the specification, i.e. and thus implemented in the UE 121, that when an N-port configuration, N>1, is defined for a discovery signal, some APs, for example {15, 17, 19, 21} should be treated as having the same channels and some other APs, for example {16, 18, 20, 22} should similarly be treated. Hence, the UE 121 may assume, detect or determine, that the channel estimates belonging to the same partitioning reflects the same channel and may thus be combined to improve the measurement performance and/or the cell detection.
  Enhancing the existing QCL definition to indicate that two or more antenna ports may be treated as being fully co-located (FCL), i.e. the channel measured on one AP is the same as the channel measured on the other FCL AP. In other words, the radio resources carrying reference signal(s) that are associated to said one AP and said other AP may all be considered to belong to a (new) same AP.
  be defined in the specification, i.e. and thus implemented in the UE 121, that when an N-port configuration, N>1, is defined for a discovery signal, new discovery signal APs are defined which is a concatenation of the CSI-RS APs in current specification. For example {15, 17, 19, 21} is a new AP, e.g. AP 115, and for example APs {16, 18, 20, 22} is also a new antenna port, e.g. AP 116. Hence, the UE 121 may assume, detect or determine, that the radio channel estimates belonging to the same partitioning reflects the same channel and may thus be combined to improve measurement performance and/or the cell detection.

Regarding different OCCs, in some embodiments, another way of achieving the increased reuse, i.e the number of discovery signals, targeted via the use of precoding in the previous embodiment is described. Currently, the orthogonal cover codes always span 2 REs regardless of the number of ports configured. In some embodiments, the length of the OCC is extended to four and eight, when four and eight antenna ports are used, respectively. Thus, the length of the OCC used depends on the number of antenna ports configured. The OCCs are vectors from a Hadamard matrix of the appropriate length. The matrices when the number of ports are 2, 4 and 8 are shown below with the matrices for the lower number of ports embedded in the matrices for the higher number of ports.

$$\begin{bmatrix} \begin{bmatrix} \begin{bmatrix} 1 & 1 \\ 1 & -1 \end{bmatrix} & \begin{matrix} 1 & 1 \\ 1 & -1 \end{matrix} \\ \begin{matrix} 1 & 1 \\ 1 & -1 \end{matrix} & \begin{matrix} -1 & -1 \\ -1 & 1 \end{matrix} \end{bmatrix} & \begin{matrix} 1 & 1 & 1 & 1 \\ 1 & -1 & 1 & -1 \\ 1 & 1 & -1 & -1 \\ 1 & -1 & -1 & 1 \end{matrix} \\ \begin{matrix} 1 & 1 & 1 & 1 \\ 1 & -1 & 1 & -1 \\ 1 & 1 & -1 & -1 \\ 1 & -1 & -1 & 1 \end{matrix} & \begin{matrix} -1 & -1 & -1 & -1 \\ -1 & +1 & -1 & 1 \\ -1 & -1 & 1 & 1 \\ -1 & 1 & 1 & -1 \end{matrix} \end{bmatrix}$$

This approach achieves the same goal and the same level of reuse, but using a different mechanism.

In some embodiments, the UE may detect, or assume or determine, that two or more APs transmitting the discovery signals on the radio resources associated with the CSI-RS represent the same radio channel by applying one or more precoding matrices, or discovery signal precoding matrices, on the two or more APs transmitting the discovery signals on the radio resources associated with the CSI-RS. In this case, the one or more precoding matrices, or discovery signal precoding matrices, is determined by the CSI-RS configuration information in the UE.

This may also be referred to as using port precoding. This is exemplified and explained more in detail with reference to FIG. 10 below. FIG. 10 shows examples of using the same 8 ports configuration in two TPs or cells using different configurable cell IDs via the use of port precoding or additional OCCs to distinguish ports transmitted from different TPs or cells. In FIG. 10, an example of port precoding to use ports {15, 17, 19, 21} in two different TPs or cells is shown.

Here, the UE 121 may assume, determine or detect, different port precoding combinations. An N antenna port CSI-RS configuration is partitioned into G=2 groups of APs with N/2 antenna ports. A codebook of (N/2)×(N/2) diagonal precoding matrices is then defined in standard text, i.e. known to both UE 121 and the network node 110. That is, in addition to ports {15, 17, 19, 21} and ports {16, 18, 20, 22} being treated as having the same channels, the network node 110 may precode ports {15, 17, 19, 21} according to any of the matrices in a codebook of precoding vectors.

For instance, the following matrices may define a codebook: diag{1, 1, 1, 1}, diag{1, −1, 1, −1}, diag{1, 1, −1, −1}, diag{1, −1, −1, 1} where the diag(v) operators puts the elements of vector v in the diagonal of a matrix:

$$\text{diag}(v) = \begin{pmatrix} v11 & \cdots & 0 \\ \vdots & \ddots & \vdots \\ 0 & \cdots & vnn \end{pmatrix}$$

Note that the first matrix simply corresponds to the treatment of ports within a set, e.g., {15, 17, 19, 21}, having the same channel. The second matrix, for instance, indicates that the phase on ports 17 and 21 is shifted by 180 degrees compared to the phase of ports 15 and 19.

The advantages of the use of a codebook of precoding matrices are two-fold. First, the degree of reuse increases significantly (by a factor of 4), since all of the precoding vectors in the codebook are orthogonal to each other. Hence, more TPs may be supported within a cell.

Furthermore, the four precoding matrices in combination with the OCCs provide a set of 8 orthogonal port combinations over 8 REs within a PRB. In combination with the five different CSI-RS configurations for 8 antenna ports, using different sets of REs the 8 orthogonal port combinations per set of REs provides a reuse of 40. At the same time performance increases significantly due to the larger number of REs within a PRB.

Note that the first matrix simply corresponds to the treatment of ports within a set, e.g., {15, 17, 19, 21}, having the same channel. The second matrix, for instance, indicates that the phase on ports 17 and 21 is shifted by 180 degrees compared to the phase of ports 15 and 19. The advantages of the use of a codebook of precoding matrices are two-fold. First, the degree of reuse increases significantly (by a factor of 4), since all of the precoding vectors in the codebook are orthogonal to each other. Hence, more transmission points can be supported within a cell.

Furthermore, the four precoding matrices in combination with the OCCs provides a set of 8 orthogonal port combinations over 8 REs within a PRB.

In combination with the five different CSI-RS configurations for 8 antenna ports, using different sets of REs the 8 orthogonal port combinations per set of REs provides a reuse of 40. At the same time performance increases significantly due to the larger number of REs within a PRB. In the definition of the CSI-RS signals, the two REs in different OFDM symbols used for a single or a pair of ports with OCCs, e.g., ports 15 and 16, comprise two different CSI-RS symbols before application of the OCC. That is, port 15 may transmit the symbols $\{1 \times s_1, 1 \times s_2\}$ whereas port 16 may transmit the symbols $\{1 \times s_1, -1 \times s_2\}$. The OCCs provide orthogonality for the two ports overlaid on the same pair of REs when the CSI-RS symbols transmitted from the two ports are the same. However, this is not the case if the ports are spread across different cells where different configurable cell IDs may be used. In this case, port 15 may transmit the same symbols as above whereas port 16 may transmit the symbols $\{1 \times s'_1, -1 \times s'_2\}$ which are different since they are coming from a different cell. This destroys the orthogonality of the pair of ports 15 and 16. Therefore, according to one aspect of some embodiments, every pair of port assignments, where the port precoding vector is the same for both the set of ports, is assigned to different transmission points using the same configurable cell ID so that they will use CSI-RS symbols. For example, if a TP is assigned ports {15, 17, 19, 21} a port precoding matrix, diag{1, −1, 1, −1}, then the set of ports {16, 18, 20, 22} with the same port precoding matrix is only assigned to a TP belonging to the same cell.

In some embodiments, the UE 121 may simply compute, or determine, measurements for all the defined precoding combinations in the precoding codebook used for discovery signals and reports the ones that have the best measurements such as highest received signal power, e.g. RSRP.

Since the codebook is known, the UE 121 does not have to be given information regarding which precoding configurations to measure on. In some embodiments, this is done very simply in the UE 121 receiver with very low additional complexity as follows. The UE 121 may first compute, or determine, metrics within each PRB corresponding to each of the ports 15 through 22. The UE 121 may then simply accumulate these metrics inside a PRB for each precoding vector possibility. This is done by simply switching the signs for metrics for each port according to the different precoding vectors before adding the metrics together. For example, the metric for precoding matrix diag{1, −1, −1, 1} applied to the set of ports {15, 17, 19, 21} simply results in summing the metrics for these ports as M15−M17−M19+M21, where M15 is the metric for port 15. Thus, the UE 121 may makes measurements for the configured CSI-RS, which defines the REs used, for the following eight possibilities: {15, 17, 19, 21}, {15 −17, 19, −21}, {15, 17, −19, −21}, {15, −17, −19, 21}, {16, 18, 20, 22}, {16, −18, 20, −22}, {16, 18, −20, −22}, {16, −18, −20, 22}.

Alternatively, in some embodiments, no partitioning of the N antenna ports for a CSI-RS configuration is done, and only a codebook is defined in specifications, and thus, known to network node 110 and the UE 121, comprising N×N diagonal matrices used to obtain N orthogonal discovery sequences.

According to another alternative, in some embodiments, partitioning of the N antenna ports for a CSI-RS configuration is done into G groups, and a codebook is defined in specifications, and thus, known to network node 110 and the UE 121, comprising (N/G)×(N/G) diagonal matrices is used to obtain N/G orthogonal discovery sequences for each of the G partitions.

Further, in some embodiments, the CSI-RS configuration information in the UE may indicate that radio resources associated with the CSI-RS, on which at least two or more APs belonging to different CSI-RS configurations are transmitting, are assigned to adjacent radio resources in the Orthogonal Frequency Division Multiplexing, OFDM, time-frequency grid when forming the discovery signals.

Any combination of the above examples for detecting, or assuming or determining, that two or more APs transmitting the discovery signals on the radio resources associated with the CSI-RS represent the same radio channel may also be performed by the UE.

Furthermore, in some embodiments, one or more CSI-RS configurations in the CSI-RS configuration information in the UE, when applied by the UE, may indicate individual one or more TPs or cells of the one or more TPs or cells. Also, in some embodiments, the CSI-RS configuration information in the UE may indicate the use of 4 or 8 APs wherein each AP is being transmitted on from different TPs or cells of the one or more TPs or cells, and wherein each TP or cell is using 4 or 8 Resource Elements, REs, within a Physical Resource Block, PRB, in the OFDM time-frequency grid.

Regarding the use of multiple proximate CSI-RS configurations, in some embodiments, multiple CSI-RS configurations may be assigned in adjacent or proximate REs to form the discovery signal for one transmission point, so that the CSI-RS configurations may be treated together to generate measurement metrics. In some embodiments, a single CSI-RS configuration of more than one port, e.g., N=8 ports is signaled to the UE 121 by the network node 110 and the UE 121 may use of these ports in some combination either via precoding or the use of new OCCs. Here, in some embodiments, the CSI-RS antenna ports across two different CSI-RS configurations are treated together yielding more flexibility and better measurement performance. For example, two four port CSI-RS configurations may be used together to yield the use of 8 REs per RB where the two four port CSI-RS configurations occupy adjacent REs so that together they form a block of 8 REs that are very close to each other. This ensures that the radio channel remains constant across them allowing the REs to be coherently combined to generate a metric. The ports within the 8 REs can be combined using the same embodiments described earlier including assuming that the ports have the same channels, precoding over and above the assumption of same channels or via the use of an OCC that spans multiple configurations. Different kind of groupings of the REs belonging in the resource element grid to neighboring CSI-RS configurations may be considered while staying within the set of possible REs that CSI-RS currently can belong to.

Regarding transmit diversity, in some embodiments, the detection and measurements by the UE 121 of discovery signals may take into account M-antenna transmit diversity by defining M>1 different signals to measure on. This may be particularly useful if the transmit antennas have two different polarizations, where the UE 121 may measure the received power from each of the two antenna ports and combine them, reflecting received power assuming transmit diversity.

For instance, based on the previous embodiments, if G partitions of the CSI-RS configuration are used, then the UE can use the signal measured on all M=G partitions together to determine received power measurements. The UE 121 shall in this case not assume that the antenna ports belonging to different partitions are fully co-located, i.e. they are estimated so as to not reflect the same channel. Instead, the UE 121 shall combine the measurements, e.g. by summing the measured power from each of the M partitions. Alternatively, M>1 precoding vectors from the discovery precoding codebook are used to define multiple measurements that the UE 121 may combine to reflect the performance taking into account transmit diversity with M antennas. Alternatively, different OCCs may be used to generate signals for measurement of M transmits antennas.

Action 703

Then, the UE 121 may estimate parameters by combining the discovery signals of the two or more APs determined to represent the same radio channel. This means that the UE 121 may estimate, or determine or calculate, parameters of the received discovery signals, such as, e.g. the radio channel estimates, etc., from a TP or cell by combining the discovery signals received on the radio resources associated with the CSI-RS of the two or more APs determined to represent the same radio channel.

Action 704

In this action, the UE 121 may use the estimated channel. In some embodiments, the UE 121 may use the estimated, or determined or calculated, parameters when performing received power and quality measurements of transmissions, such as, e.g. RSRP, RSRQ, etc., from the one or more TPs and/or cells. In some embodiments, the UE 121 may use the estimated, or determined or calculated, parameters when performing TP and/or cell detection in the radio communications network 100.

The CSI-RS configuration information in the UE may comprise a partition of all APs into two or more groups of APs wherein each group of APs represent the same radio channel. In this case, the UE may detect, or assume or determine, that two or more APs transmitting the discovery signals on the radio resources associated with the CSI-RS represent the same radio channel by detecting, assuming or determining, that the two or more APs are partitioned in the same group of APs according to the CSI-RS configuration information in the UE. In some embodiments, the UE may detect, or assume or determine, that two or more APs transmitting the discovery signals on the radio resources associated with the CSI-RS represent the same radio channel by applying one or more precoding matrices, or discovery signal precoding matrices, on the two or more APs transmitting the discovery signals on the radio resources associated with the CSI-RS. In this case, the one or more precoding matrices, or discovery signal precoding matrices, are determined by the CSI-RS configuration information in the UE. In some embodiments, the UE may detect, or assume or determine, that two or more APs transmitting the discovery signals on the radio resources associated with the CSI-RS represent the same radio channel by using a determined Orthogonal Cover Code, OCC, length spanning across the radio resources associated with the CSI-RS on which the two or more APs are transmitting. Further, in some embodiments, the CSI-RS configuration information in the UE may indicate that radio resources associated with the CSI-RS, on which at least two or more APs belonging to different CSI-RS configurations are transmitting, are assigned to adjacent radio resources in the Orthogonal Frequency Division Multiplexing, OFDM, time-frequency grid when forming the discovery signals.

Example of embodiments of a method performed by a network node 110 for handling discovery signals from one or more TPs or cells in a radio communications network 100, will now be described with reference to the flowchart depicted in FIG. 8. FIG. 8 is an illustrated example of actions or operations which may be taken by the network node 110. The method may comprise the following actions.

Action 801

In this action, the network node 110 may determine, according to a CSI-RS configuration, that two or more APs may be used to represent the same radio channel when transmitting discovery signals on radio resources associated with CSI-RS.

Action 802

Then, the network node 110 may transmit discovery signals on radio resources associated with the CSI-RS using two or more AP to represent the same radio channel.

In some embodiments, the CSI-RS configuration information in the network node may comprises a partition of all APs into two or more groups of APs wherein each group of APs represent the same radio channel. In this case, the network node may determine that two or more AP may be used to represent the same radio channel when determining that the two or more APs are partitioned in the same group of APs according to the CSI-RS configuration information.

In some embodiments, the network node may further apply a precoding, or precoding operation, on the two or more APs transmitting the discovery signals on the radio resources associated with the CSI-RS, wherein the precoding operation is determined in the network node by the CSI-RS configuration information. In some embodiments, the network node may further use a determined OCC with a length spanning across the radio resources associated with the CSI-RS on which the two or more APs are to be transmitted. In some embodiments, the network node may further the CSI-RS configuration information in the network node may indicate that radio resources associated with the CSI-RS, on which at least two or more APs belonging to different CSI-RS configurations are to transmit, are assigned to adjacent radio resources in the OFDM time-frequency grid when forming the discovery signals. In some embodiments, the CSI-RS configuration information may indicate the use of 4 or 8 APs wherein each AP is to be transmitted on from different TPs or cells of the one or more TPs or cells, and wherein each TP or cell is to use 4 or 8 REs within a PRB in the OFDM time-frequency grid.

It is beneficial to minimize the amount of information that is needed to be sent to UEs in order to perform cell discovery.

When a UE 121 performs a search for discovery signals, the UE 121 may detect the presence of the synchronizations signals, such as, the PSS/SSS, and derive, or determine, an associated cell ID from these synchronization signals.

In some embodiment, the UE 121 may determine the CSI-RS configurations and associated configurable, or virtual, cell IDs to be searched are limited based on this detected cell ID as well as CSI-RS configuration information that may have been indicated to it via RRC signaling or written into the specifications. The following information may be conveyed by the network node 110 via specifications or RRC signalling to the UE 121:

- The number of ports, i.e., 1, 2, 4 or 8, being used for discovery signals,
- The relation of the configuration (set of REs) used for the discovery signal and the cell ID,
- The set of configurable, or virtual, cell IDs to be searched based on the detected cell ID based on the PSS/SSS, and
- The set of cell IDs PSS/SSS to be searched if the set is smaller than the complete set of cell IDs indicated by the PSS/SSS.

The total number of available CSI-RS configurations is dependent on the number of CSI-RS ports being used in the configuration. With the use of 1 or 2 ports, 20 CSI-RS configurations are available, with 4 ports, 10 CSI-RS configurations are available and with 8 ports, 5 are available. This is dependent also on whether the PSS/SSS is transmitted in the same subframe as the CSI-RS or not and also on the duplexing mode. That is, the TDD frame structure may have a different set of available CSI-RS configurations. In the following, we refer to the number of available configurations as T and the number of ports per CSI-RS configuration as P. Finally, the number of configurable, or virtual, cell IDs to be searched for a given configuration is represented by V.

Then, the total search space has T*P*V discovery signal possibilities. The total number of CSI-RS configurations are then divided into groups and the network node 110 may determine the number of CSI-RS configurations, t (t could be less than the total number of configurations T) and the number of configurable cell IDs per port and configuration, V, to be searched by the UE 121. For each CSI-RS configuration, all the available ports, APs, should be searched. The advantage of searching all the APs is that the APs are largely orthogonal to one another, thus facilitating a highly, or most, efficient assignment of the available CSI-RS signal space over network nodes in the radio communications network 100. The parameters T, P, V, t may then be signalled to the UE 121 via RRC signalling. In some embodiments, the possible combinations of the parameters T, P, V and t are defined in the specifications in a table and the entry that a UE 121 should use is signaled via RRC signalling from the network node 110. The configurations to inspect, or use, by the UE 121 are then determined by the cell ID, as:

$$\min(\mathrm{mod}(\mathrm{cell\ ID},\mathrm{floor}(T/t))\times t+q, T-1), q=\{0,1,\ldots t-1\}.$$

The configurable, or virtual, cell IDs to monitor may be determined by a relationship to the detected cell ID that is defined in the specifications.

According to some embodiments, the configurable cell IDs to inspect, or use, may be determined by the UE 121 as:

$$\mathrm{mod}(\mathrm{cell\ ID}+q*\mathrm{floor}(504/V)),504), q=\{0,V-1\}.$$

In some embodiments, the following values may be used T=5, P=8 and V=1, t=1, p=8 and v=1. The CSI-RS configuration to monitor is derived, or determine, by the UE 121, from the above expressions, which may be simplified to mod(cell ID, T). For the given CSI-RS configuration, all 8 ports are monitored by the UE 121 and the configurable cell ID is assumed to be the same as the detected cell ID from the PSS/SSS. In some embodiments, the following values may be used T=20, P=2 and V=2 and t=5.

Therefore, for the above parameters, in some embodiments, sets of configurations may be configured, e.g. as one of: CSI-RS configurations to inspect by the UE 121 may be {0, 1, 2, 3, 4} if mod(cell ID, 4)=0, CSI-RS configurations to inspect by the UE 121 may be {5, 6, 7, 8, 9} if mod(cell ID, 4)=1, CSI-RS configurations to inspect by the UE 121 may be {10, 11, 12, 13, 14} if mod(cell ID, 4)=2, CSI-RS configurations to inspect by the UE 121 may be {15, 16, 17, 18, 19} if mod(cell ID, 4)=3. For each of the CSI-RS configurations above, two antenna ports and two configurable cell IDs may be searched by the UE 121.

In some embodiments, the possibilities for CSI-RS based discovery could be limited to either a 2 port, AP, CSI-RS configuration occupying 2 REs or an 8 port, AP, configuration occupying 8 REs. Then, in order for the UE 121 to know, or assume, detect or determine, which CSI-RS configurations to search, a subset of CSI-RS configurations indexed to the detected cell ID as defined by the PSS/SSS may be defined, e.g. in a standard specification. One example of this is for the CSI-RS configuration to be searched to be indexed to the detected cell ID via a certain, or determined, rule; such a rule may for example be as follows:

$$C=\mathrm{mod}(\mathrm{Cell\ ID},N/4)*(8/P)+i, i=\{0,1,\ldots,(8/P)-1\},$$

wherein N is the number of 1 or 2 port CSI-RS configurations available in the subframe, P is the number of ports being used for the discovery signal, and C is the index of CSI-RS configurations to search.

A rule, e.g. according to the above rule, results in the UE 121 searching four configurations per detected cell ID when the discovery signal is configured with 2 ports, APs, and in the UE 121 searching one CSI-RS configuration per detected cell ID when the discovery signal is configured with 8 CRS ports. This is also shown by the table below showing selection of configurations depending on number of ports configured and the detected cell ID.

| Nr. of CSI-RS ports in discovery signal/Number of single port configurations in subframe (SF) | Rule to determine configurations to be searched |
| --- | --- |
| 2/20 | mod(Cell ID, 5) * 4 + i, i = {0, 1, 2, 3} |
| 2/16 | mod(Cell ID, 4) * 4 + i, i = {0, 1, 2, 3} |
| 8/5 | mod(Cell ID, 5) |
| 8/4 | mod(Cell ID, 4) |

In some embodiments, a specific network node 110 configuration is to utilize REs for CSI-RS to mimic the reuse pattern on the CRS, i.e. a reuse pattern of either 6 or 3 REs is constructed. This may be performed by the above signalling by selecting only a specific subset of available CSI-RS configurations. For example, it is possible for the network node 110 to, within a three sector site, apply non-overlapping CSI-RS for each of the sectors. Another example is for the network node 110 to apply different OCC for the different sectors with overlapping REs or a combination of the two. Then, in the neighboring site, the same RE patterns may be reused but with a different configurable cell ID applied to it.

Figure 11:
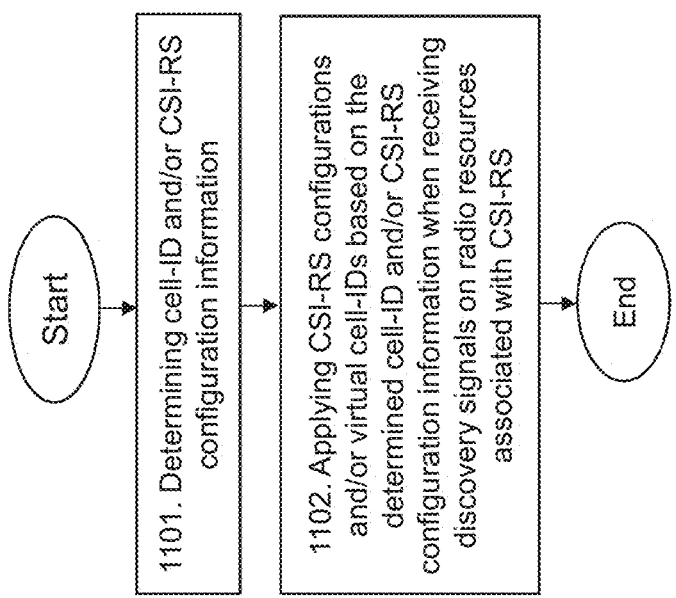
FIG. 11 is a flowchart depicting exemplary embodiments of a method for a user equipment.

Mainly in view of the above section entitled "Limiting Configurations and Configurable, or Virtual, Cell IDs", here are some further examples of embodiments of a method performed by a UE 121 for handling discovery signals from one or more TPs or cells in a radio communications network 100, described with reference to the flowchart depicted in FIG. 11. FIG. 11 is an illustrated example of actions or operations which may be taken by the UE 121. The method may comprise the following actions.

Action 1101

In this action, the UE 121 may determine and identity of a cell, cell-ID and/or CSI-RS configuration information. This means that the UE 121 may determine, or detect, an identity of a cell, i.e. cell-ID, associated with received synchronization signals, such as, e.g. PSS/SSS, and/or CSI-RS configuration information.

In some embodiments, determining the CSI-RS configuration information is performed by the UE 121 by receiving the CSI-RS configuration information via RRC-signalling from a network node serving the UE 121 in the radio communications network. Alternatively, in some embodiments, this may be performed by the UE 121 by obtaining predetermined, or determined or set, CSI-RS configuration information present in the UE 121.

Action 1102

In this action, the UE 121 may apply CSI-RS configurations and/or virtual cell-IDs based on the determined cell-ID and/or CSI-RS configuration information when receiving discovery signals on radio resources associated with CSI-RS. This means that the UE 121 may apply CSI-RS configurations and/or configurable, or virtual, cell-IDs when receiving discovery signals on radio resources associated with CSI-RS based on the determined cell-ID and/or CSI-RS configuration information. Here, it should be noted that the CSI-configuration refers to the REs where the CSI-RS is transmitted.

In some embodiments, the CSI-RS configuration information may comprise one or more of: a number of Antenna Ports, APs, to be used when receiving the discovery signals; an indication of the relation between a CSI-RS configuration and the determined identity of a cell, cell-ID, to be used when receiving the discovery signals; a set of configurable, or virtual, cell identities, or cell-IDs, associated with the determined identity of a cell, cell-ID, to be used when receiving the discovery signals; a set of precoding matrices, or discovery signal precoding matrices, associated with the determined identity of a cell, cell-ID, to be used when receiving the discovery signals; and a set of Orthogonal Cover Codes, OCCs, associated with the determined identity of a cell, cell-ID, to be used when receiving the discovery signals.

Figure 12:
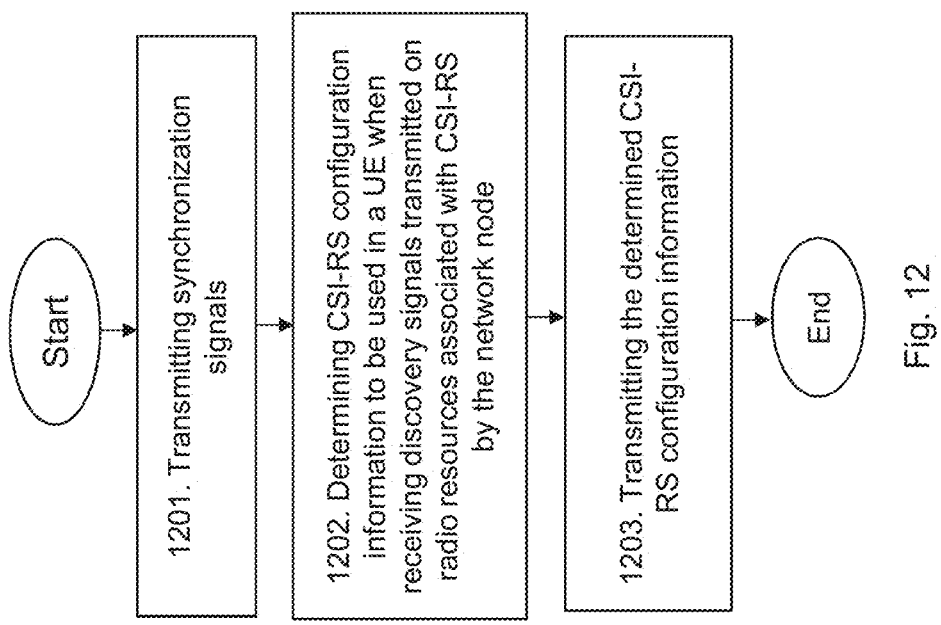
FIG. 12 is a flowchart depicting exemplary embodiments of a method for a network node.

Here are also some further examples of embodiments of a method performed by a network node 110 for handling discovery signals from one or more TPs or cells in a radio communications network 100, will now be described with reference to the flowchart depicted in FIG. 12. FIG. 12 is an illustrated example of actions or operations which may be taken by the network node 110. The method may comprise the following actions.

Action 1201

In this action, the network node 110 may transmit synchronization signals. This means that the network node 110 may transmit synchronization signals, such as, e.g. PSS/SSS, from the one or more TPs and/or cells.

Action 1202

In this action, the network node 110 may determine CSI-RS configuration information to be used in/by a UE 121 when receiving discovery signals transmitted on radio resources associated with CSI-RS by the network node 110. The CSI-RS configuration information may, e.g. comprise one or more of: a number of Antenna Ports, APs, an indication of the relation between a CSI-RS configuration and the determined identity of a cell, cell-ID, a set of virtual cell-IDs associated with the determined identity of a cell, cell-ID, a set of precoding matrices, or discovery signal precoding matrices, associated with the determined identity of a cell, cell-ID, to be used when receiving the discovery signals, and a set of Orthogonal Cover Codes, OCCs, associated with the determined identity of a cell, cell-ID, to be used when receiving the discovery signals.

Action 1203

After determining the CSI-RS configuration information, the network node 110 may transmit, to the UE, the determined CSI-RS configuration information from the one or more TPs and/or cells.

In a shared cell deployment the UE 121 may within a shared cell detect the PSS/SSS of the shared cell. The PSS/SSS is typically transmitted from all transmission points within the shared cell. Further the CRS is also transmitted within the shared cell from all the transmission points. For both the CRS and PSS/SSS they are transmitted using the same PCI and in a synchronised fashion, hence they will combine over the air. The discovery signal will be used by the UE 121 to detect the different transmission points by having a unique signal being transmitted per transmission point. This unique signal can for example be a CSI-RS based signal. The UE 121 may report RRM measurements based on the discovery signal measurements per TP and the network node 110 may then select which TP the UE 121 is scheduled from with the use of DM-RS. Consequently, the unique signal in the discovery signal per TP needs to be co-located with the DM-RS from the same TP. This is in order for the network node 110 to be able to assess what the long term quality of scheduling the UE from a certain TP is.

Hence in order to support shared cell in an effective manner the discovery signal is signalled to the UE as being QCLed with the DM-RS from the TP it is transmitted. This corresponds to QCL mode B.

Small cell on/off is supposed to support techniques targeting handover, CA (carrier aggregation) activation, dual connectivity and a new layer 1 (L1) procedure. Common for all approaches are that the UE 121 needs to be able to measure the discovery signal prior to operating on the frequency wherein the discovery signals is transmitted. The need the discovery signals fulfils for all the different approaches is that the UE 121 may measure RRM and further have rough synchronization to the cell from which the discovery signal is transmitted. Common for most of the proposal on how to support small cell on/off is that at the time the UE 121 is scheduled with PDSCH, the cell transmits CRS. How long before that the UE 121 transmits CRS differs among the different approaches, but the key aspect is that CRS is transmitted. It could also be foreseen that the cell may at some point also stop operating on/off which may have an impact for the new L1 procedure. There could then be a gain observed by indicating to the UE 121 that now the cell is not operating on/off any longer. This could for example be done by utilizing different activation commands on the Scell indicating whether or not the cell is operating on/off.

In order for the UE 121 to be able to utilise the fact that it has measured on the discovery signal when the UE 121 receives data on the cell, the UE 121 needs to be able to make some assumptions regarding the antenna ports, APs, relations between the discovery signal and the CRS. Consequently the discovery signal needs at least to be quasi co-located (QCLed) with CRS in a small cell on/off deployment.

Hence, in order to support small cell on/off in an effective manner, the discovery signal should be QCLed with the CRS. This corresponds to the QCL mode A.

This may be applied, for example, by the UE 121 being configured to assume, or detect or determine, whether the discovery signal is assuming, or is using, QCL property Type A or Type B. Another example of how this may be applied is that the UE 121 from the start may assume, or detect or determine, that the discovery signal is QCLed according to type B. The UE 121 may, in addition, be configured with operating in small cell on/off and together with that configuration the UE 121 may assume, or detect or determine, that the discovery signal is QCLed according to Type A.

The definition of Type A and Type B is defined in the standard specification 3GPP 36.213. In short, this describes, including the discovery signal:

Type A: The UE 121 may assume, or detect or determine, that the antenna ports, APs, 0-3, 7-22 and the APs that are used for the discovery signal of a serving cell are quasi co-located with respect to delay spread, Doppler spread, Doppler shift, and average delay.

Type B: The UE 121 may assume, or detect or determine, that the APs 15-22 corresponding to the CSI-RS configuration identified by the higher layer parameter qcl-CSI-RS-ConfigNZPId-r11, e.g. as defined in subclause 7.1.9, the APs that are used for the discovery signal of a serving cell and the APs 7-14 associated with the PDSCH are quasi co-located with respect to Doppler shift, Doppler spread, average delay, and delay spread.

Thus, in summary, one aspect of the above embodiments is to signal QCL relationship of type B when the discovery signals are used in a shared cell scenario, e.g. as shown for the TPs shown in FIGS. 9-10, and to signal a QCL relationship of type A when the discovery signals are used along with small cell on/off function or operation.

Below is an example of a method performed by a network node 110 for handling discovery signals from TPs or cells in a radio communications network 100. The method may comprise the following actions.

Action 1601

In this action, the network node 110 may determine whether two or more TPs and/or cells are sharing a cell, or to perform a small cell on/off procedure for the TPs and/or cells.

Action 1602

When the two or more TPs and/or cells are sharing a cell, the network node 110 may transmit discovery signals, from the two or more TPs and/or cells QCLed with DMRS specific for the UE 121.

It should here be noted that the CSI-RS in the discovery signal may be used for CSI feedback, and in this case, this CSI-RS is effectively QCLed with the DM-RS in subframes outside the discovery signal as well.

Action 1603

When performing a small cell on/off procedure for the TPs and/or cells, the network node 110 may transmit the discovery signals, from the TPs and/or cells, Quasi-Co-Located, QCL, with Cell-specific Reference, CRS, when performing a small cell on/off procedure for the TPs and/or cells.

It should here be noted that the CRS is here cell-specific reference symbols used for demodulation.

Regarding using CRS, in some embodiments, the discovery signal may be based on the CRS instead of the CSI-RS. The CRS is typically deployed with 2 ports and can be deployed with up to 4 ports. Each CRS port uses a sequence that is dependent on the cell ID corresponding to the transmitted PSS/SSS. In some embodiments, CRS port 0 is transmitted with the cell ID corresponding to the PSS/SSS, while the other CRS ports may be transmitted using sequences that are derived based on a configurable, or virtual, cell ID. With such an approach a reuse factor of at least 6 may be achieved depending on the number of frequency shifts and ports used.

Mainly in view of the above section relating to QCL relations of the discovery signal, here are some examples of embodiments of a method performed by a UE 121 for handling discovery signals from one or more TPs or cells in a radio communications network 100 The method may comprise the following actions.

Action 1701

In this action, the UE 121 may receive synchronization signals, such as, e.g. PSS/SSS.

Action 1702

In this action, the UE 121 may determine an identity of a cell, cell-ID, based on the received synchronization signals.

Action 1703

After the determination in Action 1702, the UE 121 may determine that a first AP is transmitting the discovery signals on radio resources associated with Cell-specific Reference Symbols, CRS, using the determined cell-ID, and that a second AP is transmitting the discovery signals on radio resources associated with CRS using a configurable cell-ID based on the determined cell-ID.

Action 1703

Then, the UE 121 may receive, from the one or more TPs and/or cells, the discovery signals via the first and second AP. This may be performed assuming that the first and second antenna ports, APs, are quasi co-located, QCL, with respect to the average delay and Doppler shift.

Below are also some further examples of embodiments of a method performed by a network node 110 for handling discovery signals from one or more TPs or cells in a radio communications network 100. The method may comprise the following actions.

Action 1801

In this action, the network node 110 may transmit synchronization signals, such as, e.g. PSS/SSS, from the one or more TPs and/or cells.

Action 1802

In this action, the network node 110 may determine that a first Antenna Port, AP, is to be used to transmit the discovery signals on radio resources associated with Cell-specific Reference Symbols, CRS, using the identity, cell-ID, of the cell current served by network node, and that a second AP is to be used to transmit the discovery signals on radio resources associated with CRS using a configurable cell-ID based on the cell-ID.

Action 1803

In this action, the network node 110 may transmit, from the one or more TPs and/or cells, the discovery signals via the first and second AP. Here, the discovery signal from a first TP/cell may be transmitted using the first AP, and the discovery signal from a second TP/cell may be transmitted using the second AP.

Hence to summarize the previous described embodiment, there is provided a method performed by a wireless device for handling discovery signals from one or more transmission points in a radio communications network, the method comprising: receiving synchronization signals; determining an identity of a cell based on the received synchronization signals; and determining that a first antenna port is transmitting the discovery signals on radio resources associated with Cell-specific Reference Symbols, CRS, using the determined identity of a cell, and that a second antenna port is transmitting the discovery signals on radio resources associated with CRS using a configurable identity of a cell based on the determined identity of a cell; and receiving discovery signals, from the one or more transmission points via the first and second antenna port.

And a method performed by a network node for handling discovery signals from one or more transmission points in a radio communications network, comprises: transmitting synchronization signals from the one or more transmission points; determining that a first antenna port is to be used to transmit the discovery signals on radio resources associated with Cell-specific Reference Symbols, CRS, using the identity of the cell served by the network node, and that a second antenna port is to be used to transmit the discovery signals on radio resources associated with CRS using a configurable identity of the cell based on the identity of the cell; and transmitting the discovery signals, from the one or more transmission points via the first and second antenna ports.

Figures 13, 14:
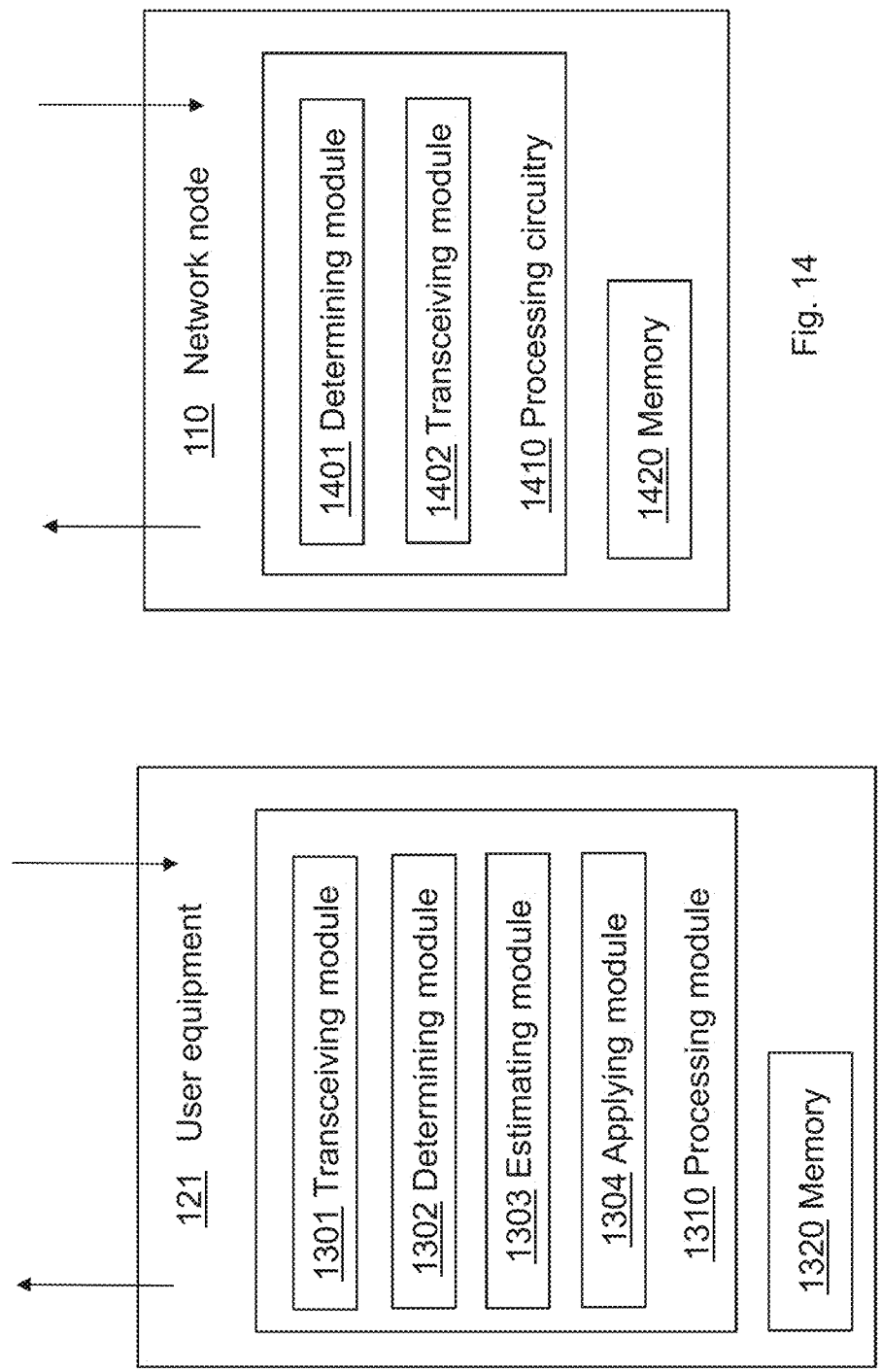
FIG. 13 is a schematic block diagram depicting exemplary embodiments of a user equipment.
FIG. 14 is a schematic block diagram depicting embodiments of a network node.

To perform the method actions in the UE 121 for handling discovery signals from one or more TPs or cells in a radio communications network 100, the UE 121 may comprise the following arrangement depicted in FIG. 13.

FIG. 13 shows a schematic block diagram of embodiments of the UE 121. In some embodiments, the UE 121 may comprise a transceiving module 1301, a determining module 1302, a estimating module 1303, and an applying module 1304. In some embodiments, the UE 121 may comprise a processing circuitry 1310, which may also be referred to as processing module, processing unit or processor. The processing circuitry 1310 may comprise one or more of the transceiving module 1301, the determining module 1302, the estimating module 1303, and an applying module 1304, and/or perform the function thereof.

The UE 121 may be configured to, or comprises the transceiving module 1301 being configured to, receive from the one or more TPs and/or cells, discovery signals on radio resources associated with CSI-RS. The UE 121 may be further configured to, or comprises the determining module 1302 being configured to, detect, or determine or assume, according to CSI-RS configuration information in the UE 121, that two or more APs transmitting the discovery signals on the radio resources associated with the CSI-RS represent the same radio channel. The UE 121 may also be configured to, or comprises the estimating module 1303 being configured to, estimate, or determine, parameters of the received discovery signals from a TP or cell by combining the discovery signals received on the radio resources associated with the CSI-RS of the two or more APs determined to represent the same radio channel.

In some embodiments, the UE 121 may also be configured to, or comprises the determining module 1302 being configured to, determine an identity of a cell, cell-ID, associated with received synchronization signals, PSS/SSS, and/or CSI-RS configuration information. In some embodiments, the UE 121 may also be configured to, or comprises the applying module 1302 being configured to, apply CSI-RS configurations and/or configurable, or virtual, cell-IDs when receiving discovery signals on radio resources associated with CSI-RS based on the determined cell-ID and/or CSI-RS configuration information.

In some embodiments, the UE 121 may be configured to, or comprises the transceiving module 1301 being configured to, receive synchronization signals, such as, e.g. PSS/SSS. Here, the UE 121 may be further configured to, or comprises the determining module 1302 being configured to, detect, or determine or assume, an identity of a cell, cell-ID, based on the received synchronization signals. Also, here, the UE 121 may be further configured to, or comprises the determining module 1302 being configured to, detect, or determine or assume, that a first AP is transmitting the discovery signals on radio resources associated with Cell-specific Reference Symbols, CRS, using the determined cell-ID, and that a second AP is transmitting the discovery signals on radio resources associated with CRS using a configurable cell-ID based on the determined cell-ID. Then, the UE 121 may be configured to, or comprises the transceiving module 1301 being configured to, receive, from the one or more TPs and/or cells, the discovery signals via the first and second AP.

In some embodiments, the UE 121 or the corresponding modules 1301, 1302, 1303 may further be configured to perform the actions described in the methods above relating to the UE 121.

To perform the method actions for handling discovery signals from one or more TPs or cells in a radio communications network 100, the network node 110 may comprise the following arrangement depicted in FIG. 14.

FIG. 14 shows a schematic block diagram of embodiments of the network node 110. In some embodiments, the network node 110 may comprise a determining module 1401, and a transceiving module 1402. In some embodiments, the network node 110 may comprise a processing circuitry 1410, which may also be referred to as processing module, processing unit or processor. The processing circuitry 1410 may comprise one or more of the determining module 1401 and the transceiving module 1402, and/or perform the function thereof.

The network node 110 may be configured to, or comprises the determining module 1401 being configured to, determine, according to CSI-RS configuration information in the network node, that two or more APs may be used to represent the same radio channel when transmitting discovery signals on radio resources associated with CSI-RS. Also, the network node 110 is configured to, or comprises the transceiving module 1402 being configured to, transmit, from the one or more TPs or cells, discovery signals on radio resources associated with the CSI-RS using two or more APs to represent the same radio channel.

In some embodiments, network node 110 may be configured to, or comprises the determining module 1401 being configured to, transmit synchronization signals, such as, e.g. PSS/SSS, from the one or more TPs and/or cells. Here, network node 110 may also be configured to, or comprises the determining module 1401 being configured to, determine CSI-RS configuration information to be used in a UE when receiving discovery signals transmitted on radio resources associated with CSI-RS by the network node. The CSI-RS configuration information may comprise one or more of: a number of Antenna Ports, APs, an indication of the relation between a CSI-RS configuration and the determined identity of a cell, cell-ID, a set of virtual cell-IDs associated with the determined identity of a cell, cell-ID, a set of precoding matrices, or discovery signal precoding matrices, associated with the determined identity of a cell, cell-ID, to be used when receiving the discovery signals, and a set of Orthogonal Cover Codes, OCCs, associated with the determined identity of a cell, cell-ID, to be used when receiving the discovery signals. Further, the network node 110 may here be configured to, or comprises the determining module 1401 being configured to, transmit the determined CSI-RS configuration information from the one or more TPs and/or cells.

In some embodiments, the network node 110 may be configured to, or comprises the transceiving module 1402 being configured to, transmit synchronization signals, such as, e.g. PSS/SSS, from the one or more TPs and/or cells. Here, the network node 110 may be further configured to, or comprises the determining module 1401 being configured to, determine that a first Antenna Port, AP, is to be used to transmit the discovery signals on radio resources associated with Cell-specific Reference Symbols, CRS, using the identity, cell-ID, of the cell current served by network node, and that a second AP is to be used to transmit the discovery signals on radio resources associated with CRS using a configurable cell-ID based on the cell-ID. Also, here, the network node 110 may be further configured to, or comprises the transceiving module 1402 being configured to, transmit, from the one or more TPs and/or cells, the discovery signals via the first and second AP.

In some embodiments, the network node 110 or the corresponding modules 1401, 1402 may further be configured to perform the actions described in the methods above relating to the network node 110.

The embodiments for handling discovery signals from one or more TPs or cells in a radio communications network 100 may be implemented through one or more processors, such as, e.g. the processing circuitry 1310 in the UE 121 depicted in FIG. 13 and the processing circuitry 1410 in the network node 110 depicted in FIG. 14, together with computer program code for performing the functions and actions of the embodiments herein. The program codes mentioned above may also be provided as computer program products, for instance in the form of data carriers carrying computer program code or code means for performing the embodiments herein when being loaded into the respective processing circuitry in the UE 121 and the network node 110, respectively. The computer program codes may e.g. be provided as pure program code in the UE 121 and the network node 110, respectively, or on a server and downloaded to the UE 121 and the network node 110, respectively. The carriers may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The UE 121 and the network node 110 may further comprise a memory 1320, 1420, respectively, which may be referred to or comprise one or more memory modules or units. The memory 1320,1420 may be arranged to be used to store executable instructions and data to perform the methods described herein when being executed in the UE 121 and the network node 110, respectively. Those skilled in the art will also appreciate that the processing circuitry 1310,1410 and their respective memory 1320,1420 described above may refer to a combination of analog and digital circuits, and/or one or more processors configured with software and/or firmware, e.g. stored in the memory 1320,1420, that when executed by the one or more processors such as the corresponding processing circuitry 1310, 1410 perform the method as described in the embodiments above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 1310,1410, cause the at least one processor to carry out the method for handling discovery signals from one or more TPs or cells in a radio communications network 100. Also, some embodiments may, as described above, further comprise a carrier containing said computer program, wherein the carrier is one of an electronic signal, optical signal, radio signal, or computer readable storage medium.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

From the above it may be seen that some embodiments may comprise a computer program, comprising instructions which, when executed on at least one processor, e.g. the processing circuitry or module 910, cause the at least one processor to carry out the method for enabling D2D communication 141 between a first and a second UE 121, 122. Also, some embodiments may, as described above, further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described the method and the network node 110, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

BS Base Station
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival

The invention claimed is:

1. A method, performed by a wireless device, for handling discovery signals from one or more transmission points in a radio communications network, the method comprising:
   determining Channel State Information Reference Symbols (CSI-RS) configuration information;
   determining an identity of a cell associated with received synchronization signals; and
   based on the determined CSI-RS configuration information and the determined identity of the cell, applying CSI-RS configurations when receiving discovery signals on radio resources associated with CSI-RS.

2. The method of claim 1, wherein determining the CSI-RS configuration information is performed by receiving the CSI-RS configuration information associated with the identity of the cell via Radio Resource Control (RRC) signaling from a network node serving the wireless device in the radio communications network.

3. The method of claim 1, wherein determining the CSI-RS configuration information is performed by obtaining predetermined CSI-RS configuration information present in the wireless device.

4. The method of claim 1, wherein the CSI-RS configuration information comprises an indication of the relation between a CSI-RS configuration and the determined identity of a cell to be used when receiving the discovery signals.

5. The method of claim 1, wherein the CSI-RS configuration information comprises at least one of:
   a set of virtual cell-IDs associated with the determined identity of a cell to be used when receiving the discovery signals; and
   a number of antenna ports to be used when receiving the discovery signals.

6. The method of claim 1, wherein a discovery signal is formed from a set of multiple CSI-RS configurations, and wherein said applying comprises searching for a discovery signal by searching for the set of multiple CSI-RS configurations from which the discovery signal is formed.

7. The method of claim 1, wherein each of the one or more transmission points is configured to be dynamically turned off when not being used, and wherein the discovery signals transmitted from the one or more transmission points are signals periodically transmitted to ensure discoverability of the one or more transmission points even when dynamically turned off.

8. The method of claim 1, comprising determining the CSI-RS configurations to apply as being a subset of CSI-RS configurations indexed to the determined identity of the cells associated with the received synchronization signals.

9. A wireless device for handling discovery signals from one or more transmission points in a radio communications network, the wireless device comprising:
one or more transceivers configured to:
receive synchronization signals; and
receive discovery signals on radio resources associated with Channel State Information Reference Symbol (CSI-RS); and
a processing circuit configured to:
determine CSI-RS configuration information;
determine an identity of a cell associated with received synchronization signals; and
based on the determined CSI-RS configuration information and the determined identity of the cell, apply CSI-RS configurations when receiving discovery signals on radio resources associated with CSI-RS.

10. The wireless device of claim 9, wherein the processing circuit is configured to determine the CSI-RS configuration information by receiving the CSI-RS configuration information associated with the identity of the cell via Radio Resource Control (RRC) signaling from a network node serving the wireless device in the radio communications network.

11. The wireless device of claim 9, wherein the processing circuit is configured to determine the CSI-RS configuration information by obtaining predetermined CSI-RS configuration information present in the wireless device.

12. The wireless device of claim 9, wherein the CSI-RS configuration information comprises an indication of the relation between a CSI-RS configuration and the determined identity of a cell to be used when receiving the discovery signals.

13. The wireless device of claim 9, wherein the CSI-RS configuration information comprises at least one of:
a set of virtual cell-IDs associated with the determined identity of a cell to be used when receiving the discovery signals; and
a number of antenna ports to be used when receiving the discovery signals.

14. A method performed by a network node for handling discovery signals from one or more transmission points in a radio communications network, the method comprising:
transmitting synchronization signals from the one or more transmission points, wherein the synchronization signals indicate an identity of a cell;
determining Channel State Information Reference Symbol (CSI-RS) configuration information based on the indicated identity of the cell, the determined CSI-RS configuration information to be used in a wireless device when receiving discovery signals transmitted on radio resources associated with CSI-RS by the network node; and
transmitting the determined CSI-RS configuration information from the one or more transmission points.

15. The method of claim 14, wherein the CSI-RS configuration information further comprises at least one of:
a set of virtual cell-IDs associated with the determined identity of a cell; and
a number of antenna ports to be used when receiving the discovery signals.

16. A network node for handling discovery signals from one or more transmission points in a radio communications network, the network node comprising:
a transceiver configured to transmit synchronization signals from the one or more transmission points, wherein the synchronization signals indicate an identity of a cell; and
a processing circuit configured to determine Channel State Information Reference Symbol (CSI-RS) configuration information based on the indicated identity of the cell, the determined CSI-RS configuration information to be used in a wireless device when receiving discovery signals transmitted on radio resources associated with CSI-RS by the network node; and
wherein the transceiver is further configured to transmit the determined CSI-RS configuration information from the one or more transmission points.

17. The network node of claim 16, wherein the CSI-RS configuration information further comprises at least one of:
a set of virtual cell-IDs associated with the determined identity of a cell; and
a number of antenna ports to be used when receiving the discovery signals.

18. A method performed by a network node for handling discovery signals from one or more transmission points in a radio communications network, the method comprising:
determining that two or more transmission points are sharing a cell; and
when the two or more transmission points are sharing a cell according to the determining, transmitting discovery signals, from the two or more transmission points quasi-co-located with Demodulation Reference Symbols (DM-RS) specific for a wireless device.

19. The method of claim 18, wherein transmitting corresponds to a quasi-co-located mode B.

20. A network node for handling discovery signals from one or more transmission points in a radio communications network, the network node comprising:
a processing circuit configured to determine that two or more transmission points are sharing a cell; and
a transceiver configured to, when the two or more transmission points are sharing a cell according to the determination, transmit discovery signals, from the two or more transmission points quasi-co-located with Demodulation Reference Symbols (DM-RS) specific for a wireless device.

* * * * *

UNITED STATES PATENT AND TRADEMARK OFFICE
CERTIFICATE OF CORRECTION

PATENT NO. : 9,801,119 B2
APPLICATION NO. : 14/438712
DATED : October 24, 2017
INVENTOR(S) : Koorapaty et al.

Page 1 of 1

It is certified that error appears in the above-identified patent and that said Letters Patent is hereby corrected as shown below:

In the Drawings

Fig. 10, Drawing Sheet 8 of 10, delete "CC" and insert -- OCC --, therefor.

In the Specification

Column 9, Line 35, delete "who's" and insert -- whose --, therefor.

Column 9, Line 46, delete "APss" and insert -- APs --, therefor.

Column 18, Line 17, delete "mod(cell ID+$q$*floor(504/$V$)),504), $q$={0,$V$–1}." and insert
-- mod(cell ID+$q$*floor(504/$V$),504), $q$={0,$V$–1}. --, therefor.

Column 21, Line 52, delete "qcI" and insert -- qcl --, therefor.

Column 22, Line 20, delete "Reference," and insert -- Reference Signal, --, therefor.

Column 24, Line 19, delete "applying module 1302" and insert -- applying module 1304 --, therefor.

Column 28, Line 8, delete "Indicator" and insert -- Indicator Channel --, therefor.

Signed and Sealed this
Twenty-fifth Day of June, 2019

Andrei Iancu
*Director of the United States Patent and Trademark Office*